INVENTOR:
Timothy A. Larry,
BY Cushman, Darby & Cushman
ATTORNEYS.

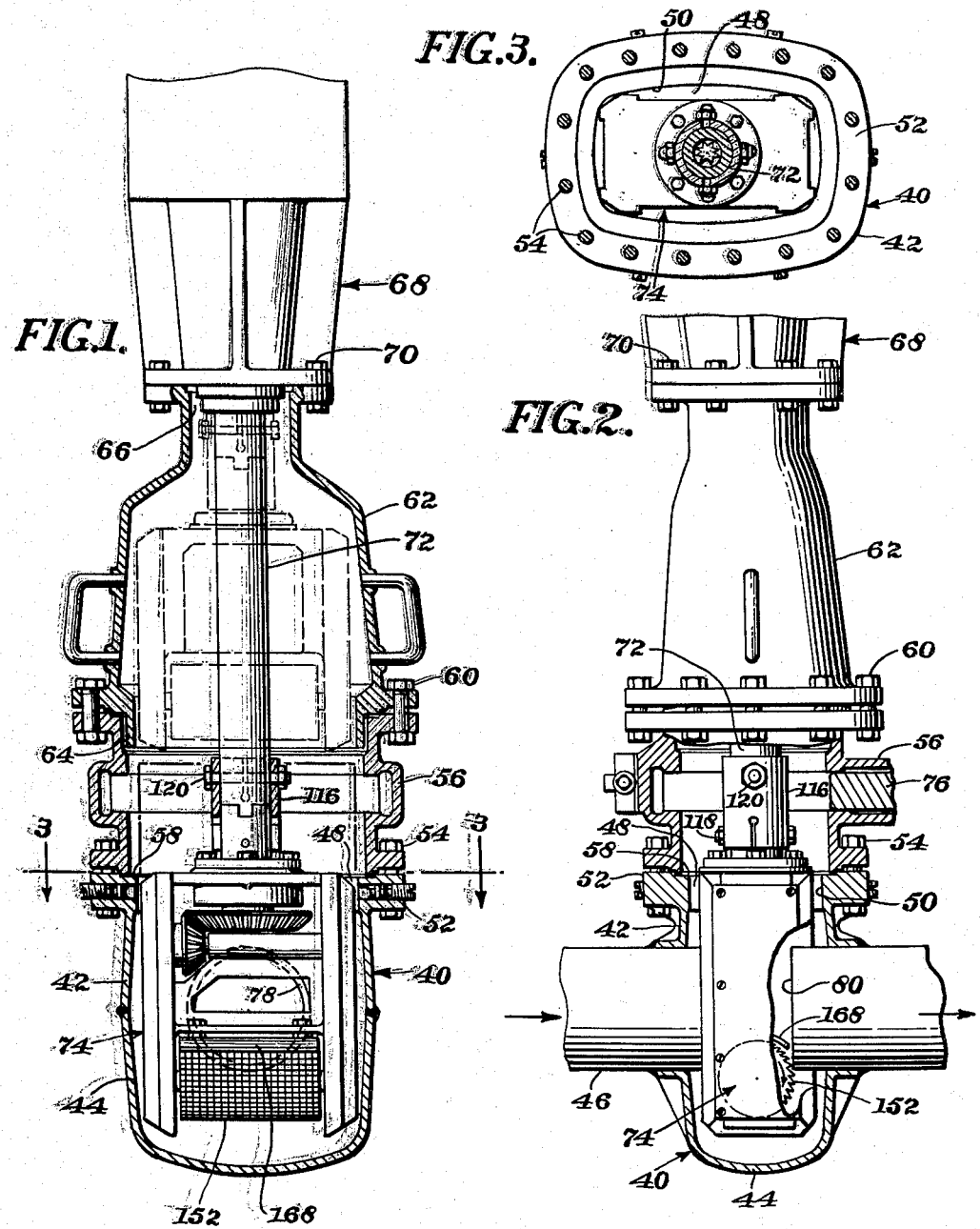

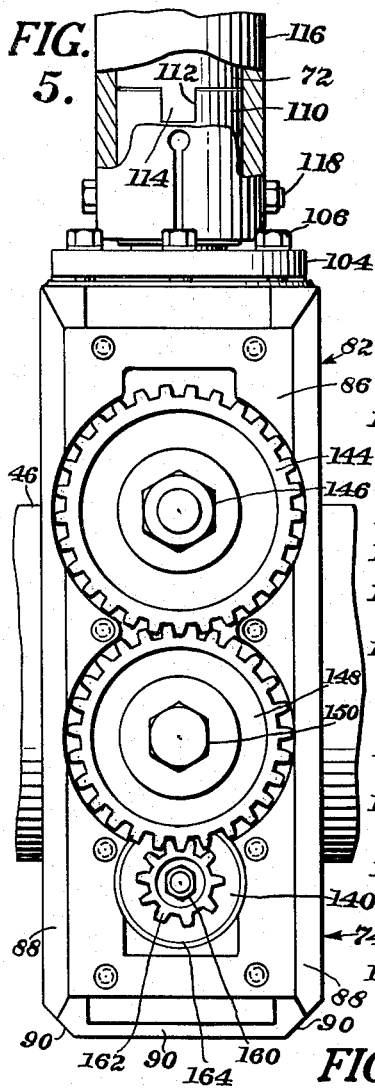
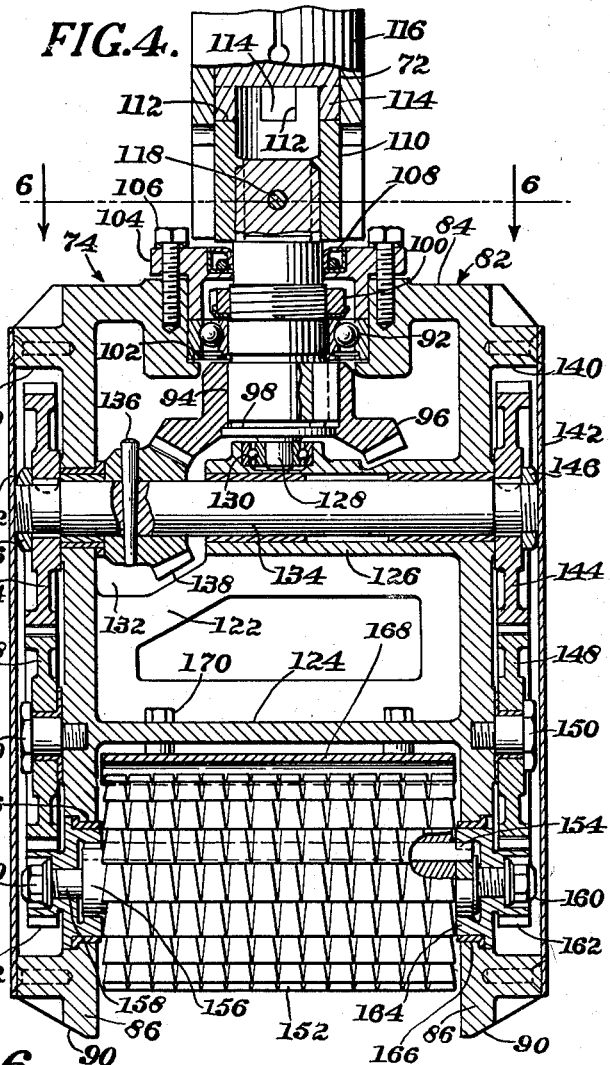

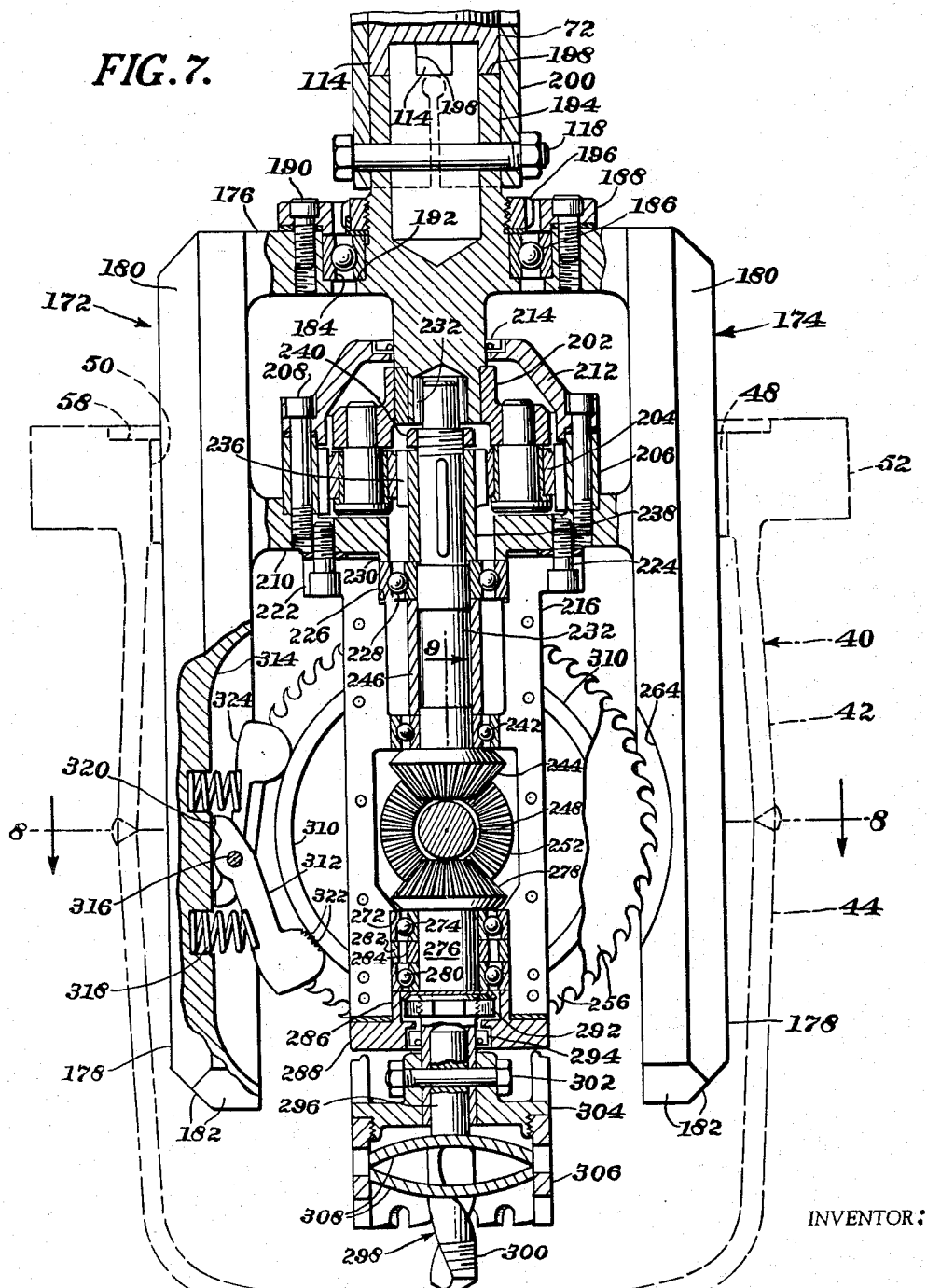

Feb. 23, 1965 T. A. LARRY 3,170,226
LINE STOPPING AND VALVE INSERTING APPARATUS AND METHOD
Filed Aug. 7, 1957 16 Sheets-Sheet 5
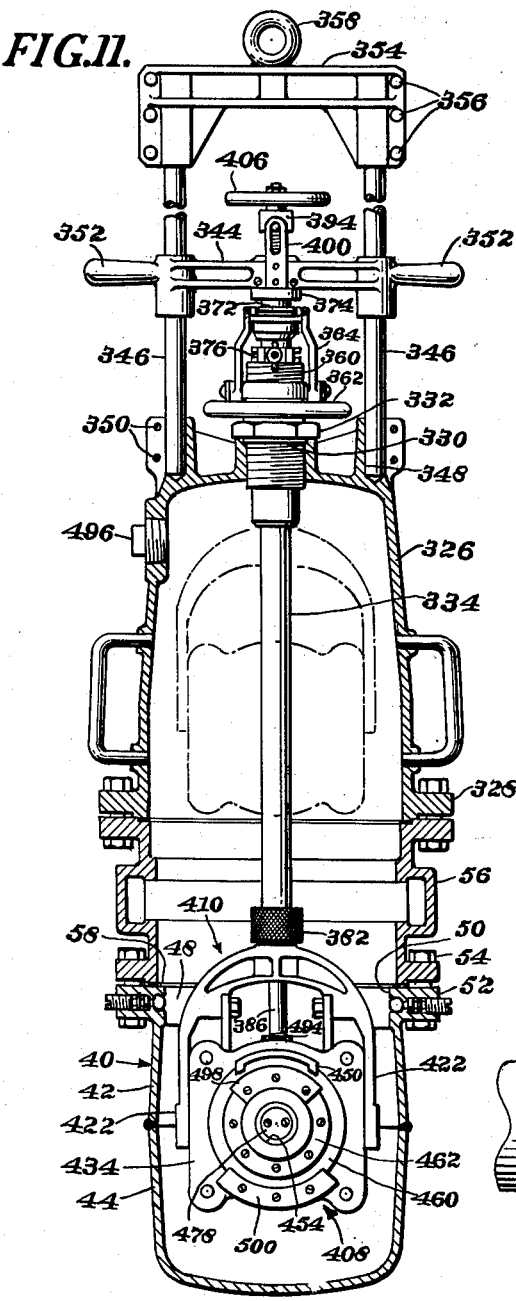
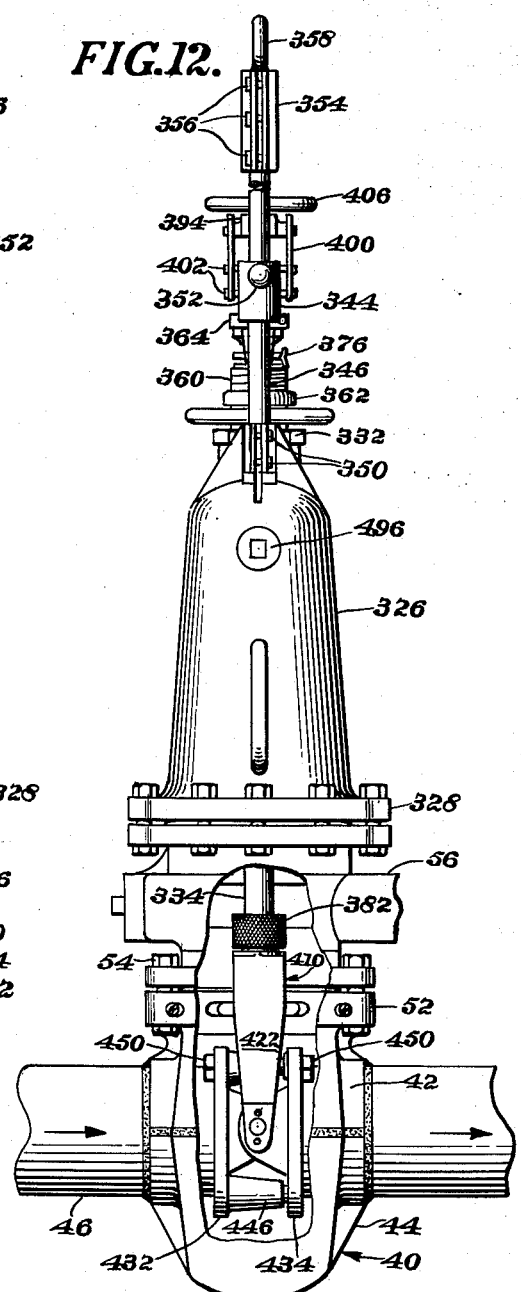
INVENTOR:
Timothy A. Larry,
BY Cushman, Darby & Cushman
ATTORNEYS.

Feb. 23, 1965 T. A. LARRY 3,170,226
LINE STOPPING AND VALVE INSERTING APPARATUS AND METHOD
Filed Aug. 7, 1957 16 Sheets-Sheet 6

INVENTOR:
Timothy A. Larry,
BY
Cushman, Darby + Cushman
ATTORNEYS.

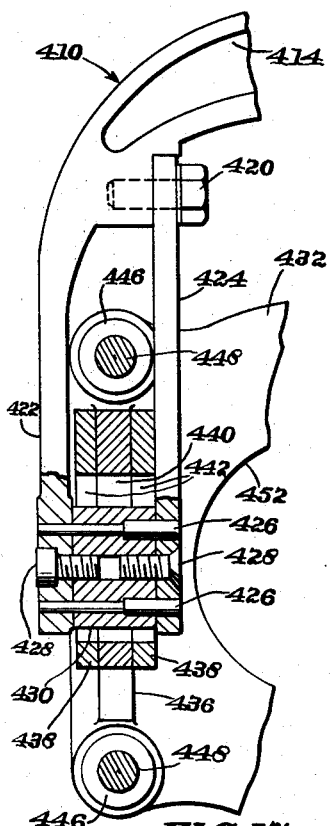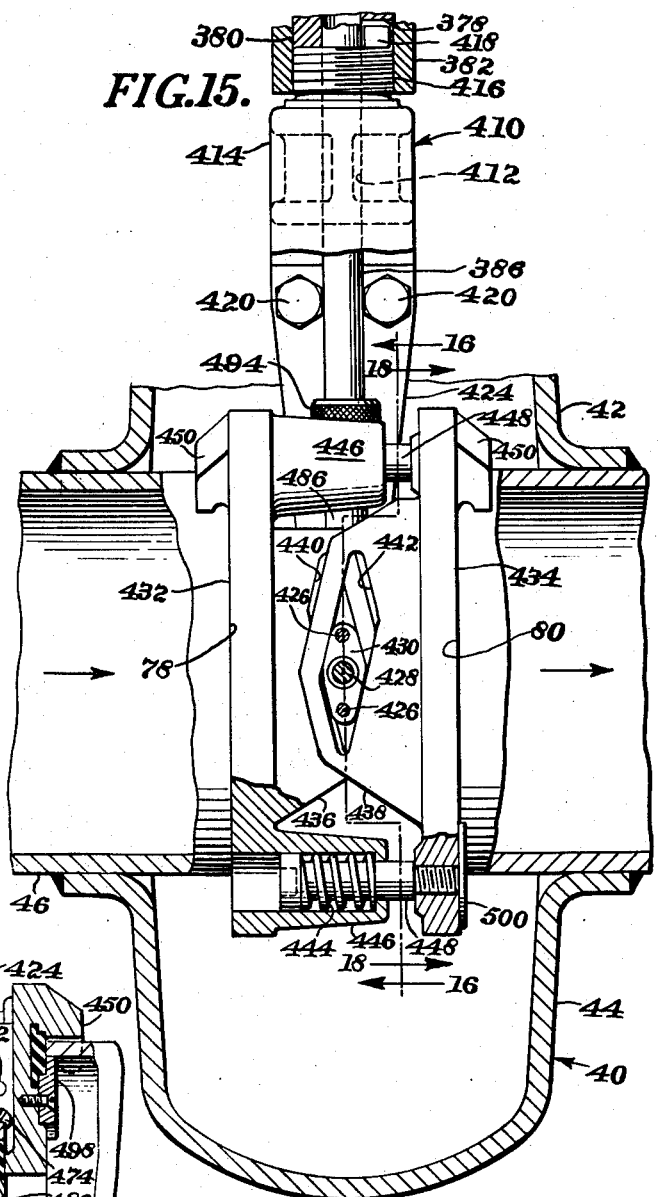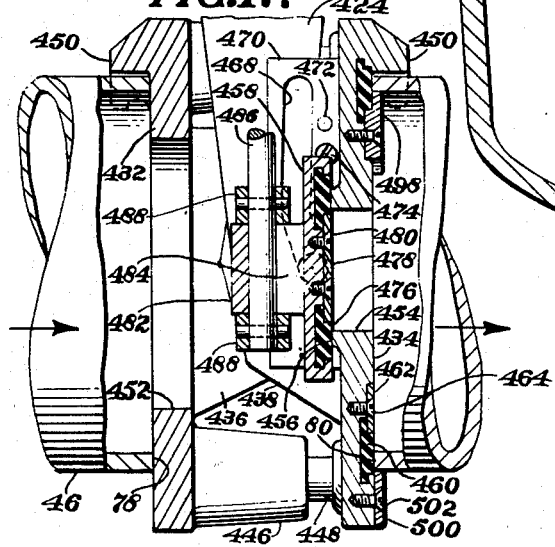

Feb. 23, 1965 T. A. LARRY 3,170,226
LINE STOPPING AND VALVE INSERTING APPARATUS AND METHOD
Filed Aug. 7, 1957 16 Sheets-Sheet 8

INVENTOR:
Timothy A. Larry,
BY Cushman, Darby & Cushman
ATTORNEYS.

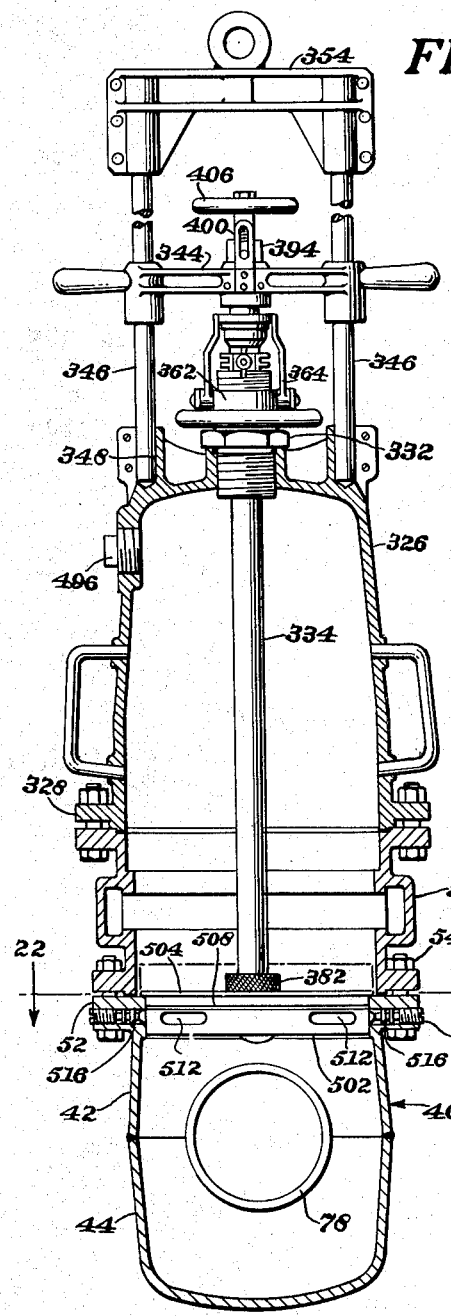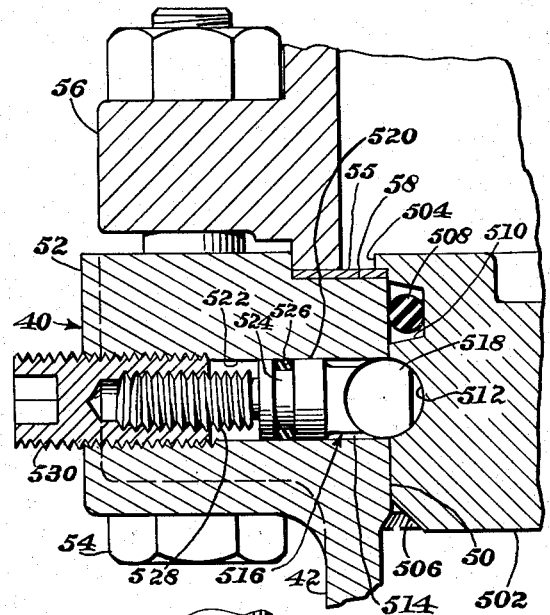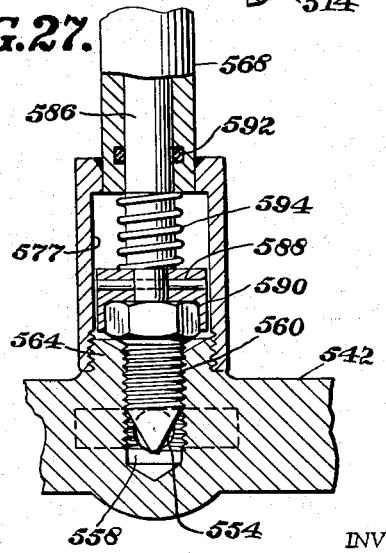

Feb. 23, 1965 T. A. LARRY 3,170,226
LINE STOPPING AND VALVE INSERTING APPARATUS AND METHOD
Filed Aug. 7, 1957 16 Sheets-Sheet 11

INVENTOR:
Timothy A. Larry,
BY Cushman, Darby & Cushman
ATTORNEYS.

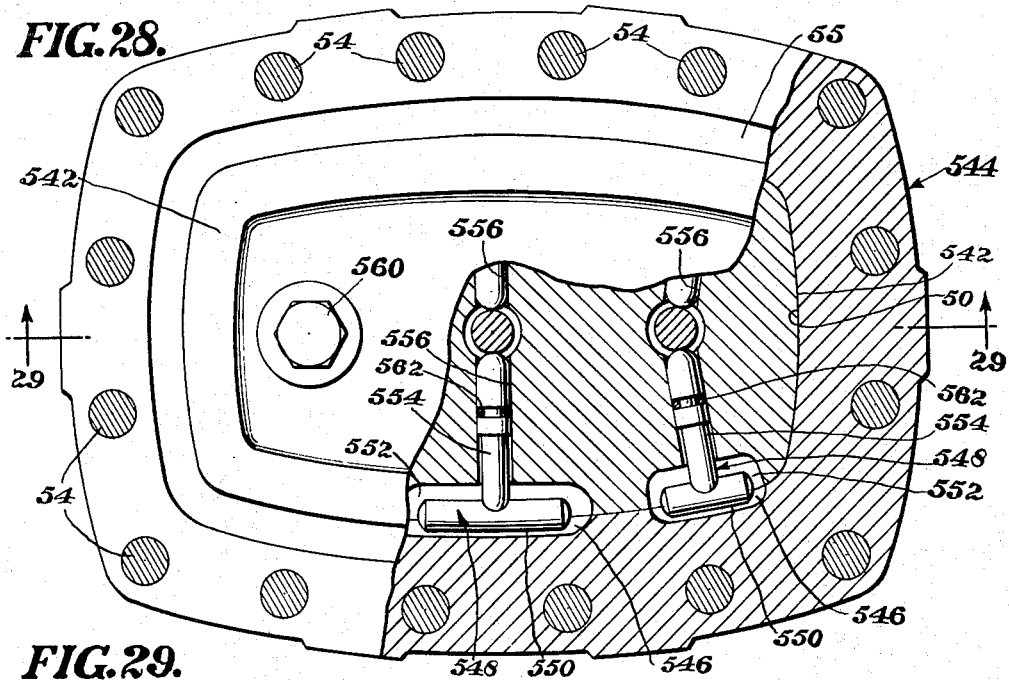
FIG. 28.
FIG. 29.
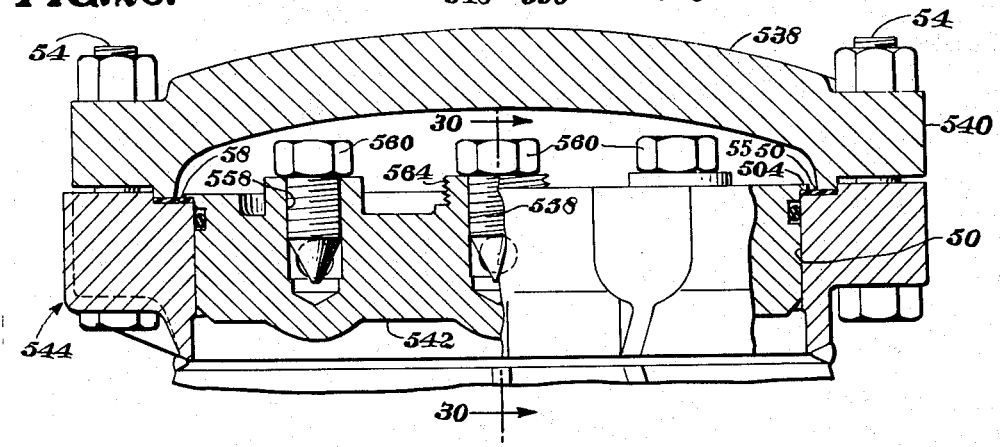
FIG. 30.
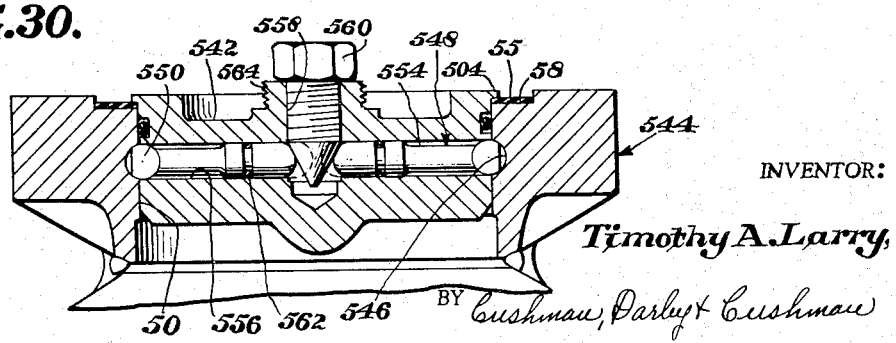
INVENTOR:
Timothy A. Larry,
BY Cushman, Darby & Cushman
ATTORNEYS.

Feb. 23, 1965 T. A. LARRY 3,170,226
LINE STOPPING AND VALVE INSERTING APPARATUS AND METHOD
Filed Aug. 7, 1957 16 Sheets-Sheet 13

INVENTOR:

*Timothy A. Larry,*

BY *Cushman, Darby & Cushman*
ATTORNEYS.

Feb. 23, 1965  T. A. LARRY  3,170,226
LINE STOPPING AND VALVE INSERTING APPARATUS AND METHOD
Filed Aug. 7, 1957  16 Sheets-Sheet 14

INVENTOR:

Timothy A. Larry,

BY Cushman, Darby & Cushman
ATTORNEYS.

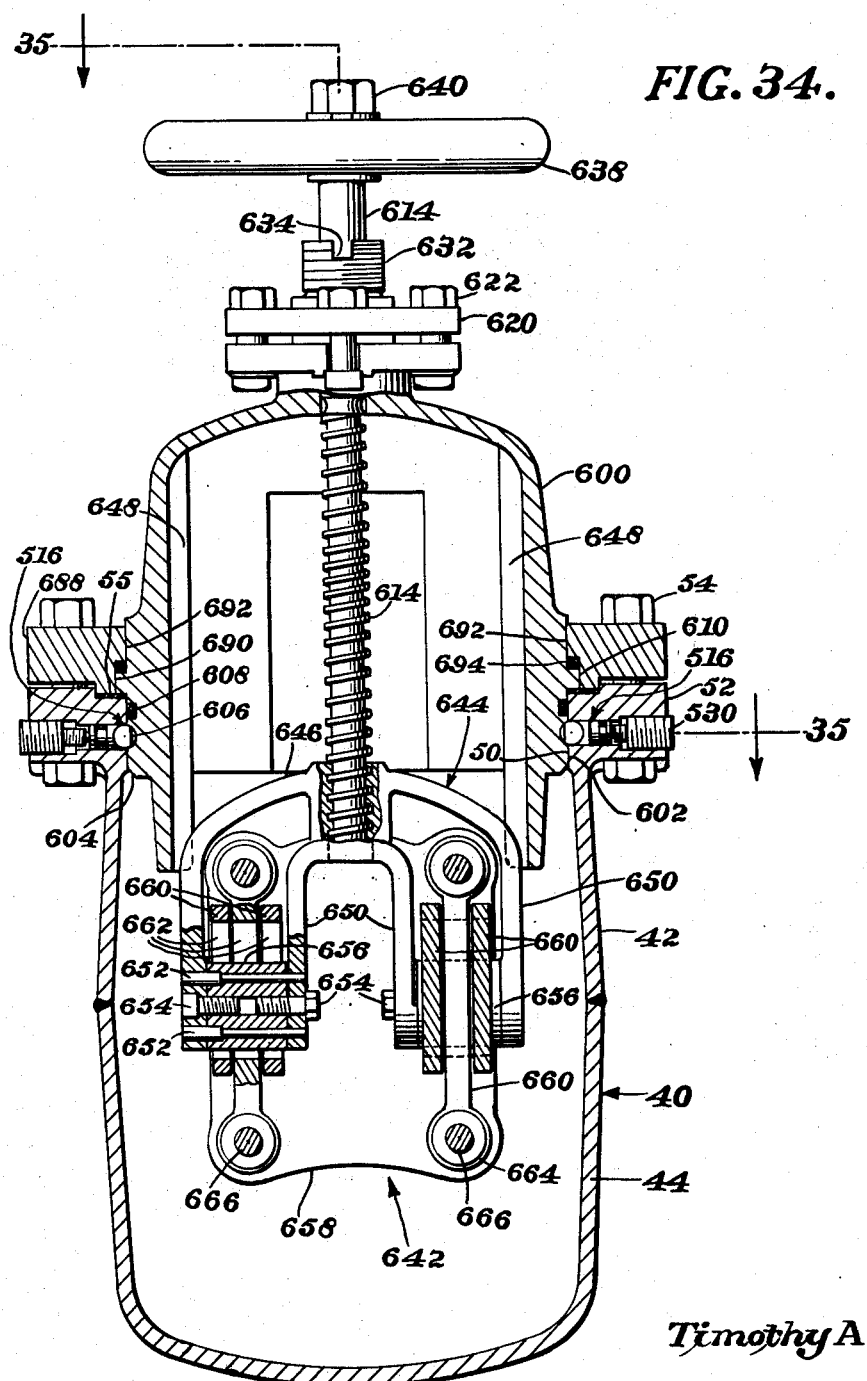

INVENTOR:
Timothy A. Larry,
BY Cushman, Darby & Cushman
ATTORNEYS.

3,170,226
LINE STOPPING AND VALVE INSERTING
APPARATUS AND METHOD
Timothy Allan Larry, San Clemente, Calif., assignor to
Mueller Co., Decatur, Ill., a corporation of Illinois
Filed Aug. 7, 1957, Ser. No. 676,902
24 Claims. (Cl. 29—157)

This invention relates to an improved method and apparatus for performing operations on a pipe line, while the latter is in service, to either stop off flow therethrough or insert a permanent valve therein.

Line stopping apparatus and methods are well-known in the art, but in the past usually have involved cutting out a transverse circular opening in the line, inserting an expansible stopper into such opening and expanding the stopper against the side edges of the opening, and within the line, to block flow therethrough. Such line-stopping apparatus and method, however, have not proved to be entirely satisfactory for larger size lines.

It is, therefore, an object of this invention to provide an improved apparatus and method for stopping off flow through a pipe line without the escape of line fluid to the atmosphere.

Apparatus of the type under consideration usually involves a stopper fitting secured to the line and having an access opening, a large pass-through valve having one end thereof detachably connected to the fitting to open or close the opening therein, and a bell detachably connected to the other end of the valve, the valve and bell in a sense constituting a pressure chamber. By using such apparatus cutting and stopping operations can be performed on the line, without escape of line fluid to the atmosphere, by tools that are movable from within the bell through the valve into engagement with the line. After stopping operations are completed, the fitting opening usually is provided with a closure so that the bell and valve can be removed from the line. The closure securing operation in the past, however, frequently has been very difficult to accomplish.

Accordingly, it is another object of this invention to provide an improved apparatus and method for securing a closure to a stopper fitting without the escape of line fluid therefrom.

Valve-inserting apparatus and methods also are known in the art, but in the past usually have been relatively expensive and complicated in manipulation.

Accordingly, it is another object of this invention to provide an improved method and apparatus for installing a relatively permanent valve in a pipe line without shutting off flow through the latter.

It is another object of this invention to provide improved line-stopping and valve-inserting apparatus and methods wherein certain parts of the apparatus and certain of the method steps are used for either line-stopping or valve-inserting operations.

An important feature of the invention is that of cutting out a section of the line within the fitting to provide opposed flat line ends. Although prior apparatus is known for effecting such a cutting operation, such apparatus has been either impractical, ineffective, very expensive, or difficult to operate.

Hence, it is a further object of this invention to provide improved apparatus for cutting out a section of a line within a fitting to provide opposed flat line ends.

Other objects and advantages of the invention will become apparent from the following description and accompanying drawings in which:

FIGURE 1 is a vertical sectional view of apparatus embodying this invention installed on a pipe line for cutting out a section thereof.

FIGURE 2 is a side elevational view, partly in vertical section, of the apparatus shown in FIG. 1.

FIGURE 3 is a sectional view taken substantially on line 3—3 of FIG. 1.

FIGURE 4 is an enlarged vertical sectional view of the cutting tool shown in FIGS. 1 and 2.

FIGURE 5 is a side elevational view of the tool shown in FIG. 4, but with a cover plate removed.

FIGURE 6 is a sectional view taken substantially on line 6—6 of FIG. 4.

FIG. 7 is a view corresponding to FIG. 4 of another form of cutting tool embodying this invention.

FIGURE 11 is a vertical sectional view of apparatus embodying this invention installed on a line for stopping off flow therethrough.

FIGURE 12 is a side elevational view, with parts broken away to show interior details, of the apparatus shown in FIG. 11.

FIGURE 15 is an enlarged fragmentary view, partly in vertical section, and with portions broken away to show details, of the apparatus shown in FIG. 12.

FIGURE 16 is a fragmentary view taken substantially on line 16—16 of FIG. 15.

FIGURE 17 is a sectional view taken substantially on line 17—17 of FIG. 18.

FIGURE 20 is a view corresponding to FIG. 11 illustrating the use of part of the apparatus shown in the latter figure for installing a closure on a stopper fitting.

FIGURE 21 is an enlarged fragmentary vertical sectional view of a portion of the apparatus shown in FIG. 20.

FIGURE 27 is an enlarged fragmentary vertical sectional view of a part of the apparatus shown in FIG. 24.

FIGURE 28 is a sectional view, with parts broken away, taken substantially on line 28—28 of FIG. 24.

FIGURE 29 is a sectional view taken substantially on line 29—29 of FIG. 28, but showing the addition of a completion cap to the latter figure.

FIGURE 30 is a fragmentary sectional view taken substantially on line 30—30 of FIG. 29.

FIGURE 34 is a vertical sectional view taken substantially on line 34—34 of FIG. 33.

The stopper or valve-inserting fitting

Figure 8:
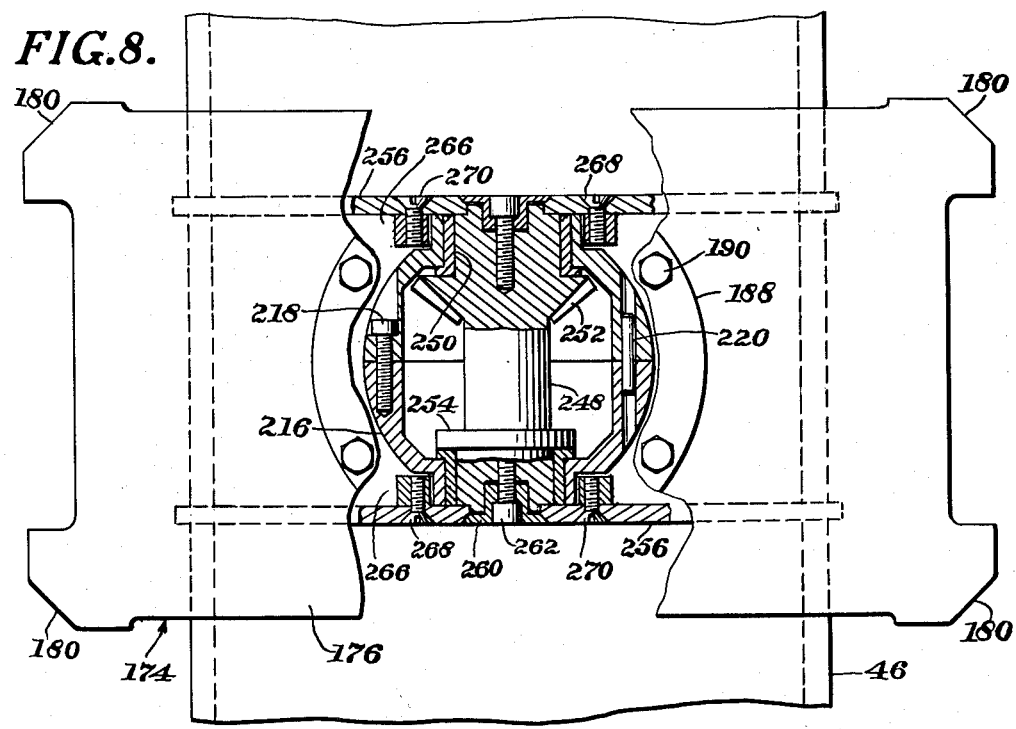
FIGURE 8 is an enlarged plan view, partly in horizontal section, of the tool shown in FIG. 7.
Figure 10:
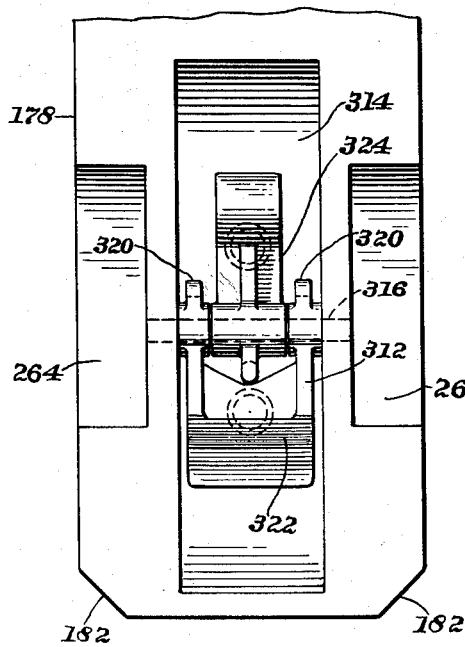
FIGURE 10 is a fragmentary view of the inner side of one of the arm portions of the tool shown in FIG. 7.
Figure 9:
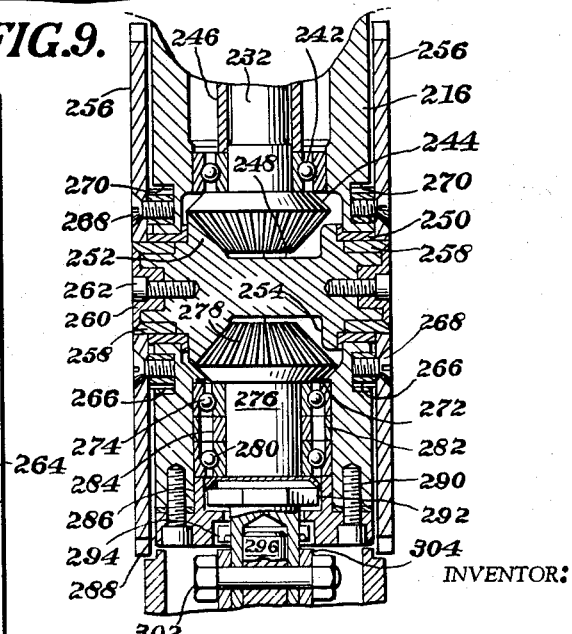
FIGURE 9 is a fragmentary sectional view taken substantially on line 9—9 of FIG. 7.
Figure 14:
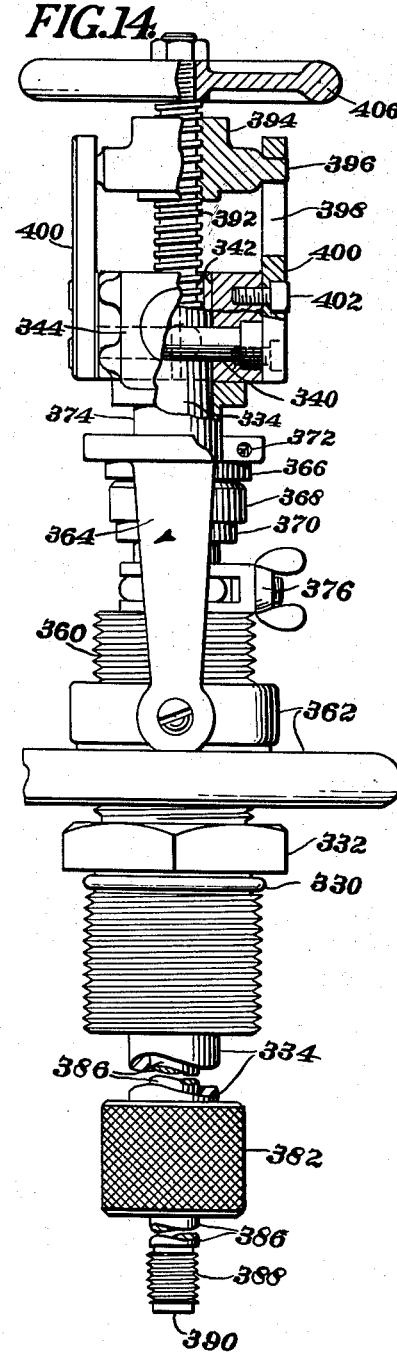
FIGURE 14 is a side elevational view, partly in vertical section, of the parts shown in FIG. 13.
Figure 13:
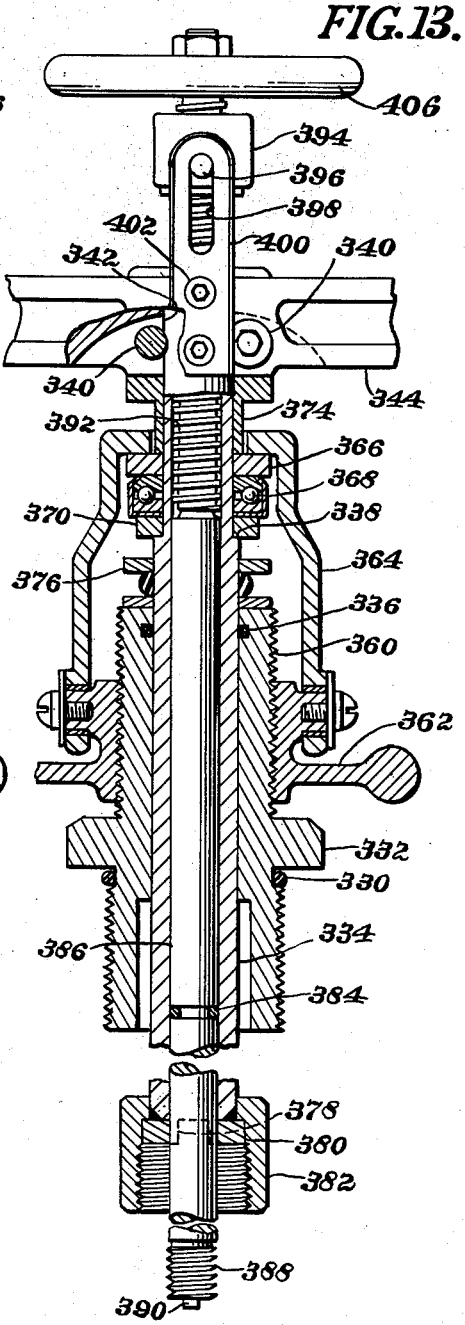
FIGURE 13 is an enlarged fragmentary view, partly in vertical section, of parts of the apparatus shown in FIG. 11.
Figure 18:
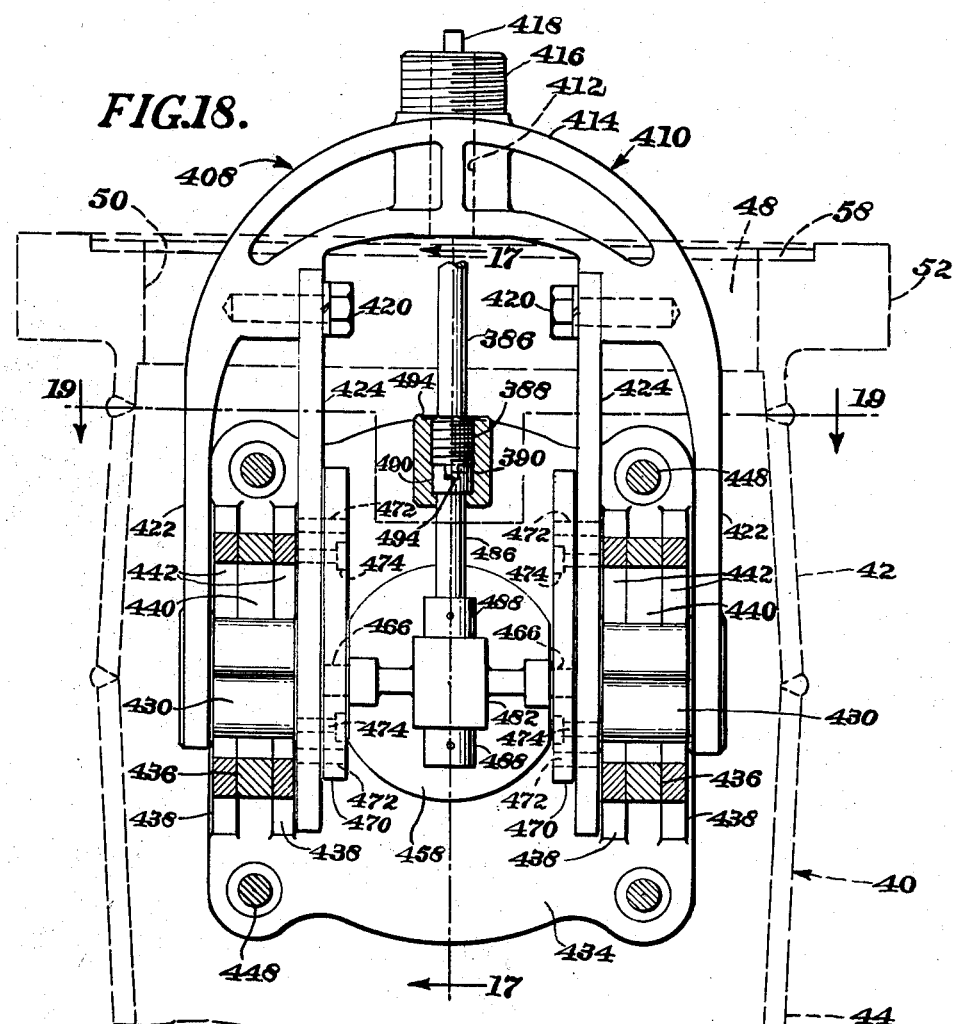
FIGURE 18 is a sectional view taken substantially on line 18—18 of FIG. 15.
Figure 19:
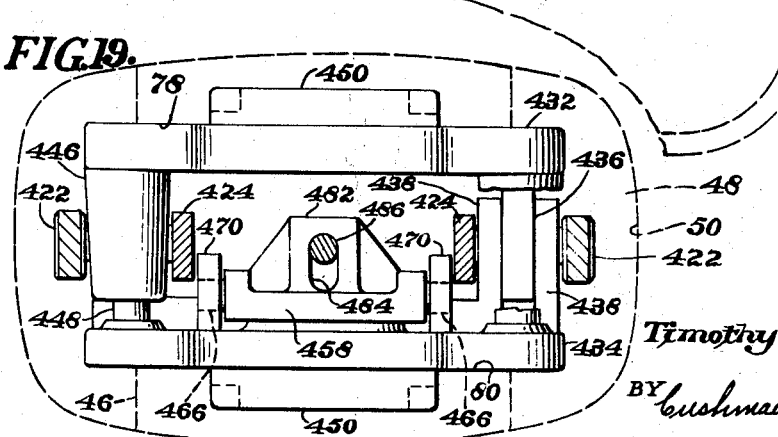
FIGURE 19 is a sectional view taken substantially on line 19—19 of FIG. 18.
Figure 23:
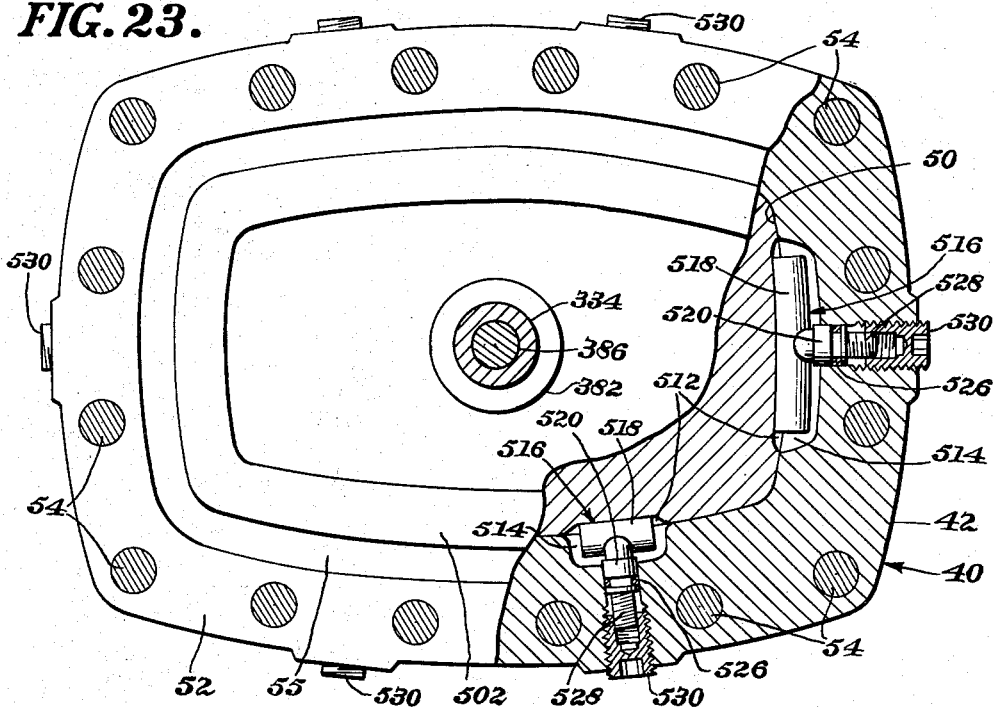
FIGURE 23 is a sectional view, with parts broken away, taken substantially on line 23—23 of FIG. 22.
Figure 22:
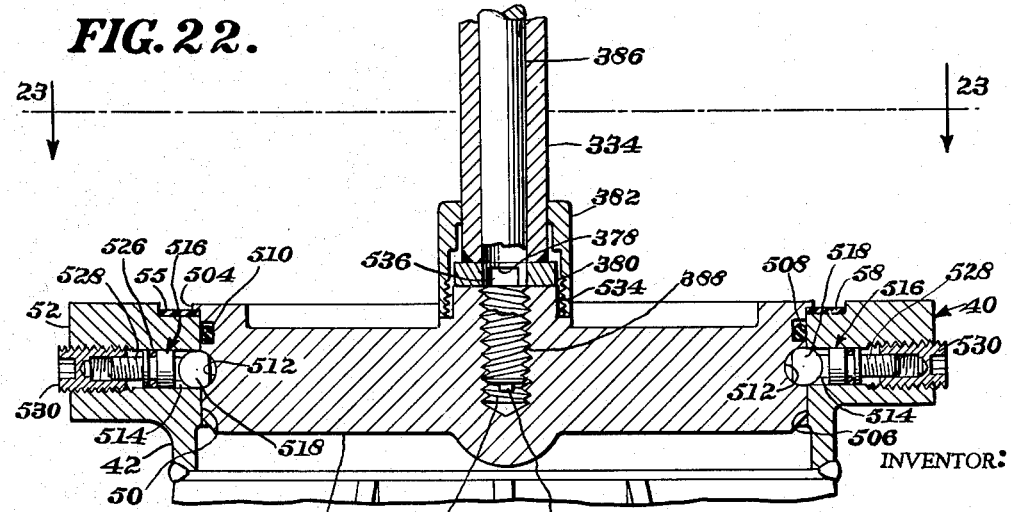
FIGURE 22 is an enlarged fragmentary vertical sectional view of a portion of the apparatus shown in FIG. 20.
Figure 24:
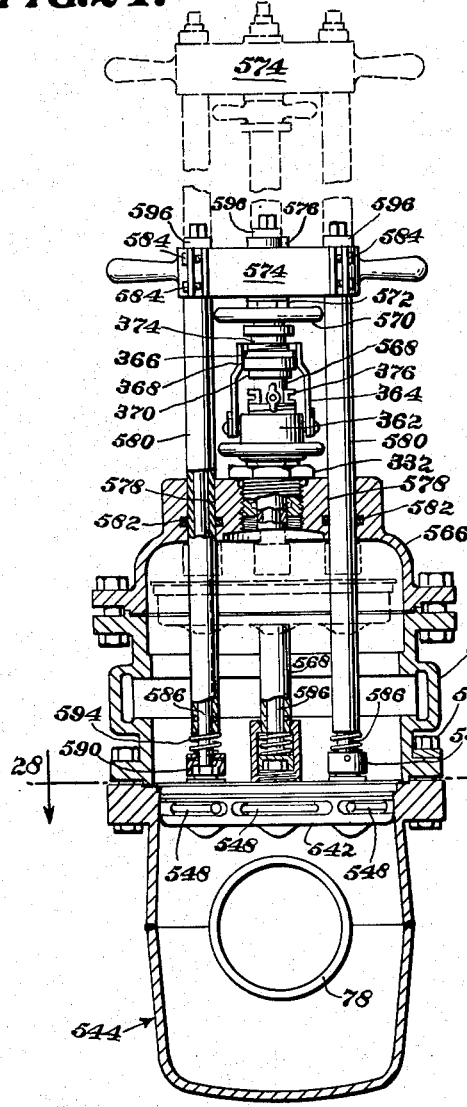
FIGURE 24 is a view corresponding to FIG. 20 but showing a modified form of apparatus for installing a modified form of closure on a modified form of a line stopper fitting.
Figure 25:
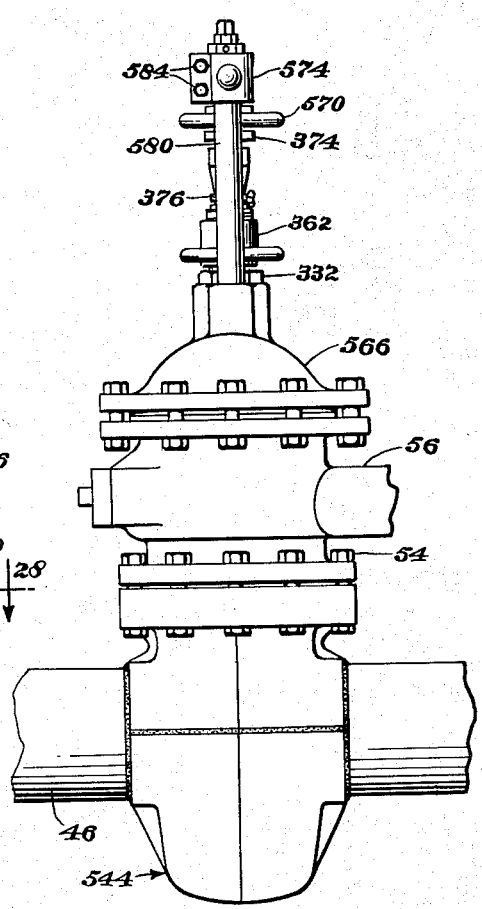
FIGURE 25 is a side elevational view of the apparatus shown in FIG. 24.
Figure 26:
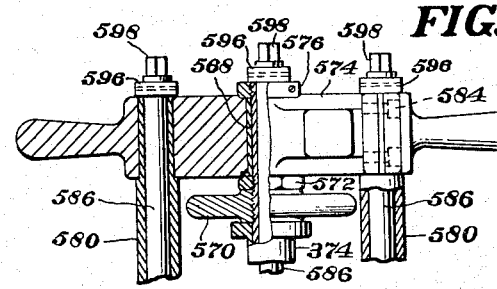
FIGURE 26 is an enlarged fragmentary view, partly in vertical section, of a portion of the apparatus shown in FIG. 24.
Figure 31:
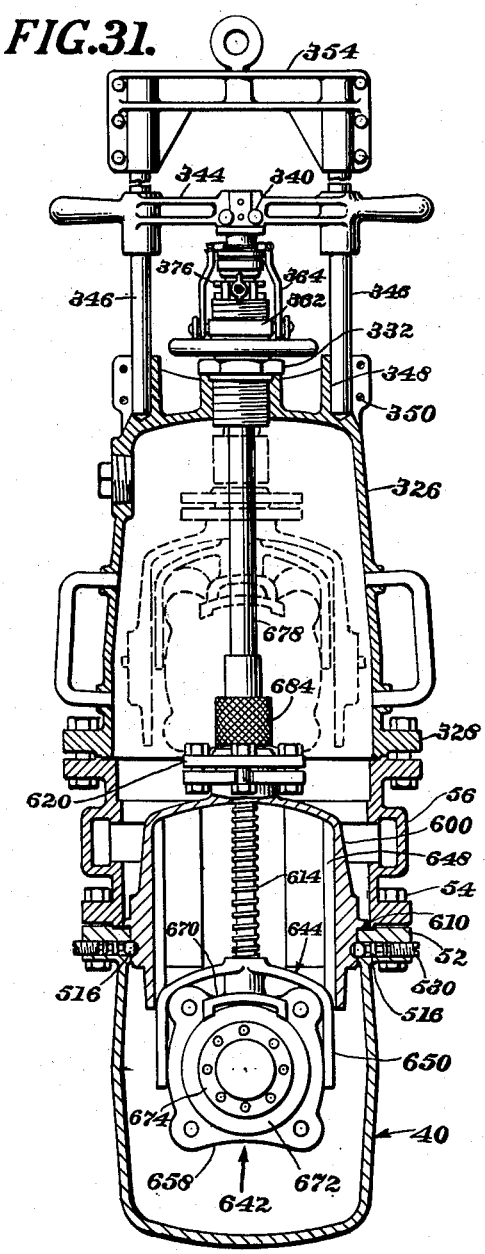
FIGURE 31 is a vertical sectional view of apparatus embodying this invention for installing an inserted valve on a line.
Figure 32:
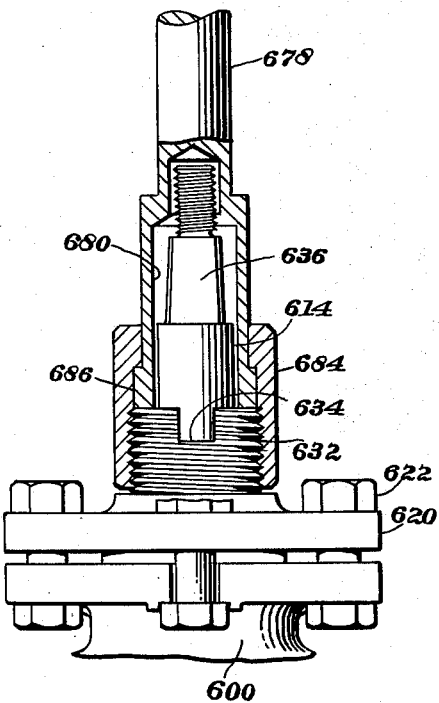
FIGURE 32 is an enlarged fragmentary vertical sectional view of a portion of the apparatus shown in FIG. 31.

Referring now to FIGURES 1, 2 and 3 of the drawings, there is shown apparatus embodying this invention for cutting into a pipe line 46, without the escape of fluid therefrom to the atmosphere, to enable the subsequent stopping off, of flow through the line or the insertion of a valve thereinto. Such apparatus includes a stopper or valve-inserting fitting 40, formed in two parts 42 and 44 having two pairs of aligned semi-circular cutouts in their meeting edges. Hence, the two parts 42 and 44 can be disposed on opposite sides of the line 46 and welded thereto, and to each other, in a conventional manner as shown in FIGURES 1 and 2, to form an enclosure about the line. For the purposes of this invention, the fitting 40 is of a substantially box-like configuration and is elongated in two dimensions laterally of the line 46, as best shown in FIGURE 1, so that the line passes normally through two opposite walls of the fitting in spaced relation to the remaining fitting walls. In order to more effectively resist interior pressures, the walls of the fitting preferably are slightly interiorly concave, as shown in the drawings. The part 44 of the fitting 40 is completely closed, while the part 42 of the fitting is provided with a generally rectangular access opening 48 that is elongated laterally of the line 46 and has slightly concave side edges 50 and curved corners, as shown in FIGURE 3.

The line cutting apparatus

The fitting 40 has a peripheral flange 52 surrounding the access opening 48 for sealingly attaching thereto, as by bolts 54 and a gasket 55, a correspondingly flanged end of a conventional pass-through gate valve 56. The opening through the valve is slightly larger than the fitting opening 48 to expose a portion of the gasket 55 on the rim 58 of the latter, for reasons later explained. Sealingly attached to the other, and flanged, end of the gate valve 56, as by bolts 60, is the open mouth of a bell 62 having a lip 64 (figured) that depends a slight distance into the corresponding end of the valve. As stated heretofore, the valve 56 and bell 62 form a pressure chamber. For reasons later explained, the interior cross-sectional configuration of the lip 64 is identical to that of the fitting opening 48. The top of the bell 62 has a central opening 66 within which projects the forward end of an enclosed pressure-tight drilling machine 68, which preferably is generally of the type disclosed in Patent No. 1,956,129, and which is sealingly attached to the top of the bell, as by bolts 70 extending through corresponding flanges on the bell and on the forward end of the machine. For the disclosure here, it is sufficient to point out that the drilling machine 68 is provided with an automatic feed wherein the boring bar 72 of the machine is both rotated and advanced at a predetermined feed rate for cutting, and also with a manual feed wherein the bar 72 is selectively advanced or retracted at a rapid feed rate without rotation.

Secured to the end of the boring bar 72 is a cutting tool 74 of a size to be retractable within the bell 62, or at least above the gate 76 of the valve 56, as shown in dotted lines in FIGURE 1. The tool 74 is adapted to be advanced, by the bar 72, through the valve 56, into the fitting 40, and against the line 46, and also to be driven by the bar to cut out a section of the line within the fitting to form opposed parallel flat line ends 78 and 80.

The cutting tools

One form of a tool for performing the cutting operation is illustrated in FIGURES 4 to 6. This tool 74 includes an elongated frame 82 that has a transverse base portion 84 and substantially parallel side arm portions 86 extending forwardly from the base portion. In transverse section the frame is generally rectangular having bevelled corners 88, as best shown in FIGURE 6, and of a size to fit relatively snugly within the opening defined by the lip 64 of the bell 62 and also within the access opening 48 in the stopper fitting 40, as best shown in FIGURE 3. It will be seen from the latter figure that the corners of the frame 82 engage with the corner portions of the lip opening in the bell 62 or the fitting opening 48 so that the frame 82 is both guided and restrained against rotation during its advancing and retracting movements by the boring bar 72, as later described. In this connection, the frame 82 is long enough so that as it moves between fully advanced or retracted positions, it will be engaged within either the lip opening in the bell 62 or the fitting opening 48, or both. Preferably, the outer edges of the forward or lower ends of the arm portions 86 are bevelled, as at 90, to facilitate their entrance into the fitting opening.

Mounted in a central opening the frame base portion 84, by an anti-friction bearing 92, is a driving shaft 94 having a bevel gear 96 keyed on the inner end thereof and engaged between the bearing and a shoulder 98 on the shaft. A lock nut 100 on the other or outer side of the anti-friction bearing 92 secures the shaft 94 against axial movement relative to the bearing, while the latter seats against an outwardly-facing shoulder 102 in the frame opening and is retained therein by an apertured cover 104 that is secured, as by screws 106, to the base portion 84 and may be provided with an oil seal 108 engaging the periphery of the shaft outwardly of the lock nut.

At its outer end the shaft 94 is reduced and has a splined fit within a short sleeve 110 having circumferentially spaced notches 112 in the upper end thereof for driven reception of driving jaws 114 on the end of the boring bar 72. A somewhat longer coupling sleeve 116 telescopes over the sleeve 110 and over the end of the boring bar 72. A bolt 118 passing through aligned diametric apertures in the sleeves 110 and 116 and the shaft 94 secures both of the former to the latter, while a bolt 120 (FIGURES 1 and 2) passing through aligned diametric apertures in the sleeve 116 and the end of the boring bar 72 secures the entire tool 74 to the latter.

The side arm portions 86 of the frame 82 are reenforced, intermediate their lengths, by a transverse web 122 that is provided at its forward or lower end with a stiffening flange 124 and at its rearward or upper end with a tubular reenforcing portion 126. The inner end of the driving shaft 94 is steadied by a reduced shaft extension 128 that is journalled, by an anti-friction bearing 130, in a socket in one side of the tubular portion 126. Both the web 122 and tubular portion 126 have a cut-out portion 132 adjacent one of the arms 86. A shaft 134 extends between and is journalled in bushed bearing apertures in the arms 86, and in the tubular portion 126. Fixed on the shaft 134, by a pin 136, within the cut-out portion, is a bevelled pinion gear 138 in meshing engagement with the bevelled gear 96. The outer side of each arm 86 is provided with an extended recess closed by a cover plate 142 and into which project the opposite ends of the shaft 134. Gears 144 are keyed on the opposite ends of the shaft 134 and secured thereto by nuts 146. These gears 144 mesh with idler gears 148 located in the recesses 140 and journalled on screws 150 attached to the arm portions 86, At the forward end of the frame 82 and extending between the arm portions 86 thereof is a milling cutter 152 that may comprise a plurality of individual cutting discs stacked and secured, as by a key 154, on an arbor 156 having reduced threaded end portions 158. Secured on the end portions 158 of the arbor 156, as by lock nuts 160, are tubular gears 162 that mesh with the idler gears 148 and have inwardly extending sleeve portions 164 that telescope over the ends of the arbor 156 and engage the key 154. The sleeve portions 164 of the gears 162 are journalled in the side arm portions 86 of the frame 82 by bushings 166. Thus, rotation of the shaft 94 by the boring bar 72 will serve to rotate the milling cutter 152, and in this connection it will be noted that the arm portions 86 extend forwardly beyond the cutter. Preferably, a curved chip shield 168 overlies the cutter 152 and is secured in place by screws 170 extending through the flange 124 and into tapped bosses on the shield.

Referring again to FIGURE 1, after the fitting 40, valve 56, bell 62, drilling machine 68, and cutting tool 74 have been assembled, in operation of the apparatus the drilling machine 68 is operated by hand to advance the boring bar 72, without rotation thereof, until the cutting tool 74 guidedly projects within the access opening 48 of the fitting 40 and the cutter 152 contacts the line 46. Thereafter, power drive of the drilling machine 68 in automatic feed serves to rotate the cutter 152, because the frame 82 is restrained against rotation by its engagement with the sides of the opening 48, and advance it against the line 46, to thereby mill away a section of the latter and provide the flat opposed parallel line ends 78 and 80. It will be seen that operation of the milling cutter 152 against the line serves to form only small chips, a majority of which will be deposited in the bottom of the fitting 40. In any event, however, the chips will be so small that they will have no detrimental effect in the operation of the pipe line 46 even if carried away from the site of the cutting operation by flow in the line.

Referring now to FIGURES 7 to 10, there is shown another form of a cutting tool for cutting out a section of the line 46 within the fitting 40 to form opposed parallel flat line ends. The tool 172 includes an elongated frame 174 that has a transverse base portion 176 and substantially parallel side arm portions 178 extending forwardly from the base portion and spaced apart a distance sufficient to straddle the line 46. As is the case with the tool 74 illustrated in FIGURES 4 to 6, the frame 174 is generally rectangular, with bevelled side corners 180 in cross section and of a size to fit relatively snugly within the opening defined by the lip 64 of the bell 62 and also within the access opening 48 in the stopper fitting 40. Consequently, the frame 174 in moving between the bell 62 and the stopper fitting 40 is both guided and restrained against rotation. Preferably, the outer edges of the forward ends of the arm portions 170 are bevelled, as at 182, to facilitate insertion of the frame 174 into the fitting opening 48.

The frame base portion 176 is provided with a central opening that is counterbored to form a shoulder 184 against which is seated the outer raceway of an anti-friction bearing 186 that is held in place by an annular retaining ring 188 secured to the base portion by screws 190. The inner raceway of the bearing 186 is seated against a shoulder 192 on a stub driving shaft 194 which is secured to the raceway by a lock nut 196 threaded onto the shaft. The outer end of the shaft 194 is socketed and provided with notches 198 in its rim for driven engagement by the jaws 114 of the boring bar 72 of the drilling machine 68. A coupling sleeve 200 telescoped over the end of the bar 72 and the end of the driving shaft 194 is secured to both, by bolts 118 and 120 in the same manner as the tool 74, in order to attach the tool 172 to the end of the boring bar.

Keyed onto the reduced inner end of the shaft 194 is a planetary gear carrier 202 of a differential reduction gear assembly. The carrier 202 has a plurality of planetary gears 204 that mesh with a ring gear 206 rigidly secured, as by screws 208, to the upper or rearward side of a transverse web 210 integrally connecting the two arm portions 178 of the frame 174 in spaced relation to the base portion 176 of the latter. Preferably, an apertured generally dome-shaped cover 212 encloses the carrier 202, the gears 204 and the ring gear 206, and is secured to the latter by the screws 208. The cover may be provided with an oil seal 214 surrounding the shaft 194 above the carrier 202. A generally tubular housing 216, that is formed in two longitudinal segments secured together by screws 218 and dowels 220 (FIGURE 8), is provided with a circumferential flange 222 at one end that is secured to the lower or forward side of the web 210 by screws 224. The housing 216 is aligned with the shaft 194 and extends forwardly between the two arm portions 178 of the frame 174. The rearward or upper end of the housing 216 is counterbored to provide a shoulder 226 against which seats the outer raceway of an anti-friction bearing 228 that is retained in place by engagement against a forwardly extending annular flange 230 surrounding a central aperture in the web 210 of the frame 174. A shaft 232 extends through the inner raceway of the bearing 228 and has a reduced outer or upper end that is journalled in a socket in the inner end of the driving shaft 194 by an anti-friction bearing 234. Keyed onto the shaft 232 is a sun gear 236 meshing with the planetary gears 204 and having an extended hub portion 238 engaged at one end with the inner raceway of the bearing 228 and at the other end by a nut 240 threaded onto the shaft 232. The lower or forward end of the shaft 232 is journalled in an anti-friction bearing 242 and has an integral bevel gear 244 engaged against the forward end of the inner raceway of the bearing 242. A tubular spacer element 246 maintains the two bearings 228 and 242 in properly spaced relation.

A shaft 248 extends transversely of the housing 216 and is journalled in the side walls thereof by bushings 250. The axis of the shaft 248 is parallel to that of the line 46 to be cut when the tool 172 is in use. The shaft 248 also has an integral bevel gear 252 meshing with the gear 244 and bearing against the inner end of one of the bushings 250, and also an integral flange 254 bearing against the inner end of the other bushing 250. Parallel circular saws 256, of a diameter slightly greater than that of the pipe line to be cut, are fixed to the projecting opposite ends of the shaft 248 by keys 258 and flanged sleeves or thimbles 260 that are secured to the ends of the shaft by coaxial screws 262. The inner sides of the arm portions 178 of the frame 174 are provided with arcuate recesses 264 to accommodate the saws 256.

It will be seen that the bushings 250 and the ends of the shaft 248 project outwardly beyond the peripheral outline of the housing 216, and in order to permit passage of the projecting shaft ends and bushing ends through the line, as later explained, the inner sides of the saws 256 are provided with supplementary annular saws 266 that are secured to the saws 256 by countersunk screws 268. The housing 216 is provided with annular cut-out portions 270 for accommodating the supplementary saws 266.

The lower or forward end of the housing 216 is counterbored to provide a shoulder 272 against which seats the outer raceway of an anti-friction bearing 274 that carries a stub shaft 276 having a bevel gear 278 on the inner end thereof meshing with the bevel gear 252. Another anti-friction bearing 280 is spaced from the bearing 274 by two tubular spacing elements 282 and 284 and is retained in place by an inwardly extending annular flange 286 on a disc-like cover 288 that is secured to the lower or forward end of the housing 216 by screws 290. The shaft 276 is maintained in place in the bearings 274 and 280 by the engagement between the inner raceway of the bearing 274 and the gear 278 and by the engagement between the inner raceway of the bearing 280 and a lock nut 292 threaded onto the shaft 276. The shaft 276 projects forwardly through a central aperture in the cover 288 and preferably is provided with an oil seal 294. The projecting forward end of the shaft 276 is provided with a socket for the reception of the shank 296 of a pilot drill 298 having coupon-retaining means, e.g., threads 300 thereon. Secured on the shaft 276, by a transverse bolt 302 which also secures the shank 296 of the drill 298 in the socket, is a shell cutter hub 304 carrying a shell cutter 306 of a diameter slightly greater than that of the tubular housing 216.

In operation of the tool 172 it will be seen that after it has been advanced from the bell 62 through the valve 56 and into the fitting 40 against the line 46, power drive of the boring bar 72 serves to drive the pilot drill 298 that is immediately followed by the shell cutter 306 to cut a circular opening in one side of the line 46 to permit passage of the tubular housing 216 thereinto. The line 46 next will be engaged by the circular saws 256 which will make parallel transverse cuts in the line. As the boring bar 72 continues to be advanced, the line 46 will be engaged and cut by the supplementary saws 266 so that the ends of the bushings 250 and the shaft 248, which constitute hubs for the saws 256, can pass into the line and thereby permit the saws 256 to cut completely through the line. Meanwhile, the shell cutter 306 cuts another circular opening through the opposite side of the line so that the tubular housing 216 can pass completely therethrough and permit the saws 256 to cut completely through the line.

The annular discs or coupons 308 cut from the line 46 by the shell cutter 306 and the pilot drill 298 are retained on the latter by the threads 300, while the longitudinally-divided section 310 cut from the line by the saws 256 is retained on the tool 172 for withdrawal therewith by spring-pressed detents mounted on the arm portions 178 of the frame 174. Each detent comprises an arm 312 having the inner end thereof disposed in a recess 314 of the corresponding arm portion 178 and pivotally connected to the latter by a transverse pin 316. A coil compression spring 318 interposed between the arm portion 178 of the frame and the arm 312 constantly urges the outer end of the latter outwardly against the line 46, the extent of such outward movement being limited by a stop 320 on the inner end of the arm engageable against the bottom of the recess 314. The outer end of the arm 312 is somewhat rounded and provided with teeth 322 that are engageable with the line 46 and inclined in a direction to restrain the cut-out section 310 of the line against movement outwardly of the tubular housing 216. Preferably, each detent also includes an untoothed pivotally mounted and spring-pressed arm 324 that is inclined oppositely from the arm 312 to engage against a rearwardly spaced portion of the line.

It will be seen that a cutting operation performed with the tool 172 creates only a small quantity of chips formed by the drill 298 and shell cutter 306 and relatively fine dust formed by the saws 256 and 266.

After the cutting operation has been completed, the drilling machine 68 is operated by hand to retract the boring bar 72 and the cutting tool 74 or 172 within the bell 62, at which time the gate valve 56 is closed, and the bell, together with the cutting tool and drilling machine is removed from the gate valve in preparation for the attachment of apparatus for stopping off flow through the line 46 or inserting a valve therein.

The line stopping apparatus

The stopping apparatus, shown in FIGURES 11 to 19, includes a stopper bell 326, similar to the bell 62, and having a peripheral flange 328 about its mouth for bolted connection to the gate valve 56, the bell and valve again forming a pressure chamber. Threaded into a central aperture in the top of the bell 326, and provided with an O-ring seal 330, is a tubular guide bushing or sleeve 332. Reciprocable through the sleeve is a stopper inserting and operating tube 334. A seal between the tube 334 and the bushing 332 may be effected by an O-ring 336 (FIGURE 13) disposed in a circumferential groove in the bushing. The projecting outer end of the tube 334 is reduced in diameter to form a shoulder 338 and the extremity of the reduced end is received, and fixedly secured by clamping screws 340, within a partially-split central opening 342 in a transversely extending guide bar 344. The opposite ends of the bar 344 are provided with guide openings slidably receiving a pair of guide rods 346 that extend parallel to the tube 334 and have their lower ends received in split clamping sockets 348 in the top of the bell 326 and secured therein by clamping screws 350. The outer ends of the bar 344 may be provided with operating handles 352 for sliding the bar along the rods 346 to reciprocate the tube 334 while maintaining the latter against rotation. Preferably, the outer ends of the rods 346 are connected together by a transverse tie bar 354 having split clamping openings to receive the rods which are secured in place by clamping screws 356. The tie bar 354 may be provided with a central lifting eye bolt 358.

The bushing 332 is provided with an outer extension having exterior feed threads 360 engaged by a handled feed nut 362. Pivotally connected to the nut 362 are the arms of a yoke 364 having a notch in its base portion adapted to straddle the tube 334. The base portion of the yoke 364 is adapted to engage over a thrust washer 366 on the tube 334 and having an anti-friction bearing 368 interposed between the washer 366 and another thrust washer 370 seated against the shoulder 338 on the tube. It will be seen that when the yoke 364 is engaged with the thrust washer 366, and secured about the tube by a cotter pin 372, rotation of the nut 362 in one direction will serve to force the tube 334 inwardly of the bell 326 with a force greater than that which can be developed by a manual force exerted on the handles 352 of the guide bar 344. Preferably, a thrust collar 374 is interposed between the guide bar 344 and the thrust washer 366 so that an inward force on the bar is exerted, through the washers 366 and 370 and bearing 368, against the shoulder 338 on the tube 334. Additionally, an adjustable clamping collar 376 is mounted on the tube 334 and bears against the upper end of the bushing 332 so that the tube can be supported in any position of vertical adjustment relative to the bell 326.

The inner end of the tube 334 is provided with a key notch 378 in its rim and with a peripheral flange 380 for engagement by a coupling nut 382. Extending through the tube 334, and sealed thereto by an O-ring 384 disposed in a circumferential groove within the tube, is a valve operating rod 386 having a threaded inner end 388 provided with an axially extending transverse flange or key 390. The outer end of the rod 386 is provided with threads 392 of considerable axial extent, and engaged with the threads, outwardly of the guide bar 344, is a nut 394. Guide lugs 396, on opposite sides of the nut 394, are received in elongated guide slots 398 in upstanding guide plates 400 secured on opposite sides of the guide bar 344 by screws 402. Secured by a nut 404 on a reduced extension on the outer end of the rod 386 is a hand wheel 406 for rotating the rod. From the foregoing construction it will be seen that rotation of the hand wheel 406, with the guide lugs 396 engaged with one or the other ends of the slots 398, will serve to move the rod 386 axially relative to the tube 334, while the latter has a limited range of free reciprocatory movement independently of its rotation by the hand wheel.

The line stopper

A stopper assembly 408 embodying this invention is best illustrated in FIGURES 15 to 19, and includes a generally U-shaped frame 410 having a central aperture 412 in its base 414 for slidably receiving the lower end of the valve operating rod 386. The frame 410 is rigidly secured to the lower end of the tube 334 by engagement of the coupling nut 382 with an exteriorly threaded boss 416 surrounding the aperture 412. An upstanding lug or key 418 on the boss 416 fits within the notch 378 in the end of the tube 334 in order to maintain the frame 410, when secured to the tube, in a position extending transversely of the pipe line 46.

Secured, as by screws 420, to the base 414 of the frame, and extending in inwardly spaced substantially parallel relation to the arm portions 422 of the frame, are arms 424 which provide a substantially bifurcated construction for the arm portions of the frame. Secured between the outer ends of each arm 422 portion and its corresponding arm 424, as by dowels 426 and screws 428 (FIGURE 16), is a cam element 430 that is of substantially diamond-shaped configuration in cross section. Disposed on opposite sides of the frame 410 are two stopper plates 432 and 434 having, on their opposed inner sides, two sets of overlapping wing members, one 436 on one plate projecting between two 438 on the other, which project between each arm portion 422 and arm 424. The wing members 436 and 438 of each set are provided with oppositely inclined cam slots 440 and 442, respectively, within which is received the corresponding cam element 430, as best shown in FIGURE 15. The construction is such that when relative linear movement between the plates 432 and 434 and the frame 410 takes place in directions extending parallel to the tube 334, the plates are forced apart or drawn toward each other by the interengagement of the inclined surfaces of the camming elements 430 with the corresponding surfaces of the cam slots 440 and 442 in the wing members 436 and 438, respectively. Thus, when the plates 432 and 434 move toward the base 414 of the frame 410, the plates are forced apart, and when moved away from the base are forced together. The plates 432 and 434 are constantly urged toward each other by coil compression springs 444, one at each corner of the plates that are engaged between an inwardly extending flange at the outer end of a hollow boss 446 on the plate 432 and the head of a screw 448 which extends through such boss into threaded engagement with the plate 434, as shown in FIGURE 15.

On the outer face of each plate 432 and 434, at that edge thereof adjacent the base 414 of the frame 410, are arcuate abutment or stop members 450 in position to engage the sides of the line ends 78 and 80. In the normal contracted condition of the stopper assembly 408, i.e., when the plates 432 and 434 are moved toward each other to their smallest extent of separation, the thickness of the stopper assembly, i.e., the distance between the outer faces of the two stopper plates, is less than the separation between the two line ends 78 and 80. In this contracted condition, however, the stop members 450 project beyond the stopper plates a distance sufficient to engage with the sides of the line ends 78 and 80 as the stopper assembly is moved linearly between such line ends.

The stopper plate 432 is adapted to engage against the upstream line end 78 and has a relatively large flow opening 452 therethrough, while the stopper plate 434 is adapted to engage the downstream line end 80 and has a relatively small flow opening 454 therethrough provided at its inner end with a valve seat 456 engageable by a valve member 458, as best shown in FIGURE 17. The outer face of the plate 434 has an annular valve washer insert 460 that is retained in place by a retaining ring 462 secured to the plate by screws 464. The washer insert 460 is adapted to engage the downstream line end 80 to effect a tight seal thereagainst.

The valve member 458 has a pair of laterally extending guide lugs 466 which ride in cam grooves or slots 468 formed in plates 470 secured to the inner sides of the inner wing members 438, as by dowels 472 and screws 474. At least the lower ends of the grooves 467 are inclined, as shown in FIGURE 17, so that, as the valve member 458 is moved toward the forward or lower edge of the stopper plate 434, the valve member is forced normally against the valve seat 456, and as the valve member is moved toward the rearward or upper edge of the plate, the valve member is moved normally off of the valve seat. The sealing face of the valve member 458 preferably is provided with an annular valve washer insert 476 retained in place by a retaining disc 478 that is fastened to the valve member by screws 480.

Projecting from the rear side of the valve member 458 is an integral bracket element 482 provided with an aperture 484 therethrough that is in vertical alignment with the frame aperture 412 but is elongated in a direction extending normal to the valve seat 456. A valve-operating stub rod 486 extends through the aperture 484 and is retained against axial but for rotary movement therein by collars 488 that are pinned to the rod and bear against the opposite ends of the bracket element 482. That end of the rod 486 adjacent the base 414 of the frame 410 is provided with an enlarged head 490 having a transverse kerf 492 therein for engagement by the key 390 on the end of the valve operating rod 386, while the stub rod 486 is secured to the rod 386 against axial movement by a coupling nut 494 threaded onto the end of the rod 386 and engaged with the enlarged head 490.

After the cut has been effected in the line, as described above, and the bell 62 has been replaced with the stopper bell 326 with the stopper assembly 408 secured to the stopper inserting tube 334, and the latter held up by the clamping collar 376 to position the assembly within the bell, as shown in dotted lines in FIGURE 11, the gate valve 56 is opened, the collar 376 loosened, and the guide bar 344 is pushed manually to move the stopper assembly from the bell 326 through the gate valve 56 into the fitting 40 and between the line ends 78 and 80 until the stop members 450 on the stopper plates 432 and 434 engage the sides of the line ends. Continued inward movement of the stopper tube 334, by the handles 352 on the guide bar 344, serves to expand the stopper assembly 408, i.e., force the stopper plates 432 and 434 apart by the interaction of the cams 430 and the cam slots 440 and 442, oppositely against the line ends 78 and 80. At this time the yoke 364 is engaged over the thrust washer 366, and the feed nut 362 rotated to impart a greater inserting force to the tube 334 and, consequently, a greater seating force of the plates 432 and 434 against the line ends 78 and 80. Additionally, it will be seen that the yoke 364 firmly retains the stopper plates in engagement against the line ends.

During the expansion of the stopper assembly 408, it will be seen that the linear lost motion connection, i.e., slots 398 and nut lugs 396, between the valve-operating rod 386 and the stopper inserting tube 334, permits relative linear movement between the stopper frame 410 and the stopper plates 432 and 434 without any interference by the rod 386. Similarly, it will be seen that the plate 434, together with the valve member 458, can move laterally of the rod 386 because of the elongated slot connection 484 between the stub rod 486 and the valve member.

After the stopper plates have become seated against the line ends, as before described, the valve-operating hand wheel 406 is rotated in a direction to move the rod 386 inwardly and seat the valve member 458 firmly against the seat 456, to thus shut off flow into the downstream side of the line 46 while permitting communication between the upstream side of the line, i.e., the end 78, and the interior of the fitting 40 and, consequently, the interior of the stopper bell 326. As is well-known in the art, a bypass line (not shown) may be connected to the stopper bell 326, on removal of a plug 496 therein.

When the miller type of cutting tool 74 is employed to cut out a section of the line 46 within the fitting 40, the tool has a tendency to form "feathers" on opposite sides of the line in the direction of rotary movement of the cutter 152. In other words, when the milling cutter 152 is rotated in the direction shown in FIGURE 2, very thin elongated burrs or "feathers" depend from the upper and lower sides of the downstream line end 80 and extend upwardly on the upstream line end 78. The "feathers" on the latter have no detrimental effect, but those on the downstream line end 80 might damage the stopper plate washer 460 or otherwise impair its seal with the downstream line end. In order to remove the "feathers" from the downstream line end, the plate 434 preferably is provided with shear plates that will cooperate with the edges of the line end 80, as the stopper plate is forced thereagainst, to shear off the "feathers." The shear plate for the upper side of the line end 80 may be formed by an integral enlarged portion 498 of the washer retaining ring 462 that projects a slight distance into the line end 80 and fits snugly therein when the plate 434 engages the line end, while the shear plate for the lower side of the line end 80 may be formed by a separate arcuate strip 500 secured to the plate 434 by screws 502 in position to snugly engage the lower side of the line end.

On completion of any operations to be accomplished on the line 46 while the flow therein is shut off by the stopper assembly 408, the line is unstopped by first rotating the hand wheel 406 in a direction to move the valve member 458 off of its seat 456 to thus permit flow to take place through the port 454 in the plate 434 and equalize the pressures existing on opposite sides of the latter. The yoke 364 is then disengaged from the thrust washer 366 on the tube 334 so that the latter can be pulled outwardly by the handles 352 on the guide bar 344 to thus collapse the stopper assembly 408, both by the action of the springs 444 and the reverse camming or wedging action between the cams 430 and the cam slots 440 and 442. In this connection it will be seen that the plate 434 can easily be unseated from the downstream line end 80 because there is no pressure differential across such plate that tends to force it tightly against such end. Absent the pressure-equalizing control effected by the valve member 458, a large pressure differential across the plate 434 during a stopping operation would render it extremely difficult to unseat the stopper plate and collapse the stopper assembly 408 for withdrawal of the latter from between the opposed line ends 78 and 80. Even if such could be accomplished, the stopper plate 434 literally would be dragged across the line end 80 with resulting great damage to the washer 460.

After collapse, the stopper assembly 408 is drawn upwardly into the stopper bell 326 and the clamping collar 376 tightened onto the tube 334 so that the stopper assembly will be held in its position within the bell. Thereupon, the gate valve 56 is closed and the stopper bell 326, together with the stopper assembly 408, is removed in preparation for the attachment of a closure to the fitting 40.

The closure for the fitting

Referring now to FIGURES 20 to 23, there is shown a closure for the stopper fitting 40. The closure comprises a plug 502 which snugly fits within the access opening 48 in the fitting 40 and has a small peripheral flange 504 engageable with the gasket 55 on the rim 58 of the fitting opening to limit the extent of insertion of the plug within such opening. Preferably, the inner edges of the plug 502 are bevelled, as at 506, to facilitate insertion of the plug into the fitting opening 48. A seal for the plug 502 is effected by an O-ring 508 disposed in a peripheral groove 510 in the plug for engagement with a smooth-surfaced peripheral zone in the side edges 50 of the access opening 48. Inwardly of the O-ring groove 510 in the plug 502, the periphery of the latter is provided with a series of peripherally spaced and elongated locking grooves or recesses 512, here shown as being of less than 180° arcuate or semi-circular configuration in cross section.

The side edges 50 of the access opening 48 are provided with corresponding recesses 514 that are aligned with the plug recesses 512 when the plug 502 is inserted fully into the opening 48. Disposed in each of the edge recesses 514 is a locking element 516, best shown in FIGURES 21 and 23, of generally T-shaped configuration having a head 518 that is completely receivable within its recess 514 and a stem 520 that projects into a bore 522 extending outwardly through the wall of the fitting 40 from the bottom of the recess 514. The head 518 of each locking element 516 is substantially circular in cross section, for mating engagement within the corresponding peripheral recess 512 in the plug 502. The stem 520 of each element 516 is provided with a smooth-surfaced cylindrical portion, immediately outwardly of the head 518, and such portion is provided with an O-ring groove 524 and an O-ring 526 therein for sealing engagement with the bore 522. Outwardly of the O-ring groove 524 the element 516 has a reduced threaded portion 528 engaged within a threaded socket in the inner end of a screw 530 threaded into a tapped counterbore at the outer end of the bore 522. The engaged threads on the stem portion 528 and the screw socket are of one direction, while the engaged threads on the screw 530 and the counterbore are in the other direction, i.e., one set of threads is right hand and the other left hand. Hence, rotation of the screw 530 in one direction will rapidly project the head 518 of the locking element 516 out of its recess 514 and into locking engagement with the corresponding recess 512 in the plug 502, while rotation of the screw in the opposite direction will rapidly retract the locking element from such locking engagement.

The top of the plug 502 is provided with a central threaded socket 532 for engagement by the threaded end 388 of the valve-operating rod 386. Surrounding the socket 532 is a boss 534 having an upstanding lug or key 536 thereon receivable in the key notch 378 in the rim of the tube 334.

In order to secure the plug closure 502 to the stopper fitting 40, after the line 46 has been unstopped as described above, the coupling nuts 382 and 494 are detached from the stopper assembly frame 410 and the valve-operating rod 386, respectively, and the valve-operating rod 386, by operation of the hand wheel 406, is drawn rearwardly within the tube 334 until the forward end of the rod is substantially flush with that of the tube. The plug 502 is then placed against the end of the tube 334, with the key 536 in the notch 378, and the end 388 of the rod 386 screwed, by the hand wheel 406, into the socket 532 in the plug. For this purpose the threads on the rod end 388 preferably are of the same or greater pitch than the threads 392. Thus, the plug 502 is firmly secured on the end of the tube 334, and correctly oriented for insertion into the fitting opening 48 by the key 536 and notch 378. The stopper bell 326 is then re-attached to the gate valve 56, the clamping collar 376 loosened, and the plug 502 pushed forwardly by the guide bar 344, from within the bell, through the gate valve, and into the access opening 48 in the fitting 40 until the peripheral flange 504 on the plug seats on the gasket 55 on the rim 58 of the fitting opening. When the plug 502 is so inserted, the O-ring 508 effects a tight seal with the fitting 40.

As the O-ring 508 initially seals with the peripheral sealing zone on the edges 50 of the fitting opening 48, it may become quite difficult to manually insert the plug 502 to its full extent because of line pressure within the fitting 40. In this event, the yoke 364 may be engaged with the thrust washer 366 and the feed nut 362 rotated to force the tube 334, and the plug 502, into the fitting opening 48 until the flange 504 on the plug seats on the gasket 55.

After the locking recesses 512 in the plug 504 are aligned, or substantially aligned, with the locking elements 516, the screws 530 are rotated, by an appropriate tool (not shown) to project the heads 518 of the locking elements into locking engagement with the plug recesses 512. In this connection, even if exact alignment between the locking element heads 518 and the locking recesses 512 is not initially obtained, it will be seen that the curved configuration of the heads and the recesses will tend to cam the plug 502 into a position wherein the proper alignment is obtained.

After the plug 502 is locked in place by the locking elements 516, the rod 386 is unscrewed, by operation of the hand wheel 406, from the plug socket 532, and the tube 334 withdrawn into the stopper bell 326, and held in such position by the clamping collar 376. Thereupon, the stopper bell 326, and also the gate valve 56, are unbolted from the fitting 40 and completely removed therefrom. Thereafter, a cap 538 having a peripheral bolting flange 540 (FIGURE 29) may be secured in place, as by the bolts 54, to the top of the fitting 40. Preferably, the cap 538 seats against the gasket 55 in order to provide an additional seal, and also to prevent dirt from entering between the plug 502 and the edges 50 of the access opening and lodging in the O-ring groove 510 outwardly of the O-ring 508 therein.

From the description thus far it will be seen that the opening 48 of the fitting 40 is rectangular in configuration primarily to restrain rotation of the cutting tools 74 or 172 and also to serve as a guide for correctly oriented insertion of the line stopper assembly 408. Obviously, any convenient non-circular configuration of the opening 48, the frames of the tools 74 or 172, and of the assembly 408 would serve the same purpose. Moreover, it is not essential that the opening 48 be non-circular throughout its entire length or depth. It would be sufficient for the opening 48 to be non-circular for only a section of its depth or length.

Thus, for example, although not shown in the drawings, the opening 48 could be made of guiding non-circular configuration throughout only an inner section, and then flare outwardly to a circular configuration outwardly of such non-circular section. Such circular section, preferably would be of an axial extent which encompasses the zone which includes the locking elements 516 and the surface engaged by the O-ring 508. Such a construction would have manufacturing advantages because the guiding portion can be made to an acceptable tolerance by forging; whereas the surfaces engaged by an O-ring for sealing purposes must be machined, and the machining of a circular surface is accomplished with machines that are less expensive than those necessary to machine a non-circular surface.

It further will be seen that the feature of the invention which includes the locking elements 516, is susceptible of other applications; for example, the securing of a closure plug in the access opening of a service T the securing of a valve bonnet to a valve casing, etc.

*The modified line fitting, closure therefor, and attaching apparatus*

Referring now to FIGURES 24 to 30 of the drawing, there is shown a modified type of closure plug 542 for a stopper fitting 544 that also is slightly modified for conformance with the modified closure. In this embodiment of the invention, locking recesses 546, similar to the aforedescribed plug locking recesses 512, are provided in the edges 50 of the fitting opening, while locking elements 548 are carried by the plug 542. As before, the locking elements 548 are substantially T-shaped having heads 550 that are completely disposable within peripherally elongated recesses 552 in the periphery of the plug 542. The stems 554 of the locking elements 548 project into bores 556 in the plug 542 that extend inwardly from the periphery thereof and terminate within threaded sockets 558 extending inwardly from the top of the plug. The inner ends of the stems 554 are rounded, or otherwise provided with inclined surfaces, for camming engagement by the conical ends of camming screws 560 engaged in the sockets 558 and having hexagonal or other non-circular heads. The stem 554 of each locking element 548 is sealed within its corresponding bore 556, as by an O-ring 562 mounted in a circumferential groove in such stem. It will be seen that as a screw 560 is threaded inwardly, the camming engagement between its conical end and the rounded end of a locking element stem 554 will force the locking element 548 outwardly into locking engagement with its locking recess 546 in the edge 50 of the fitting opening. As shown in FIGURES 28 and 29, three such camming screws 560 are employed, one centrally located and each having camming engagement with two locking elements 548. An exteriorly threaded boss 564 surrounds the central socket 558, for reasons later described.

For installation of the aforedescribed modified type of closure, there is employed a relatively shallow bell 566 that is bolted to the gate valve 56 in lieu of the stopper bell 326. The top of the bell 566 is provided with a central threaded opening for the reception of a guide bushing 332, feed nut 362, and yoke 364, similar to those previously described. Rotatably and reciprocably extending through the bushing 332 is a plug-carrying and inserting tube 568 having thereon a clamping collar 376 below a shoulder against which is stacked a thrust washer 370, an anti-friction bearing 368, another thrust washer 366 for engagement by the yoke 364, and a thrust collar 374, as previously described with respect to the stopper inserting apparatus. Threaded onto the tube 568 against the thrust collar 374 is a hand wheel 570 that is locked against rotation relative to the tube by a jam nut 572. Outwardly beyond the jam nut 572 the tube 568 is reduced and provided with a smooth-surfaced portion that is journalled for rotation in a bushed bearing aperture in a transverse tie bar 574. The bar 574 seats against the jam nut 572, while a split lock nut 576 is threaded onto the outer end of the tube 568 to hold the latter against axial movement relative to the bar. At its lower end the tube 568 has an enlarged threaded socket 577 for reception of the boss 564 on the plug 542.

On opposite sides of the bushing 332, the bell 566 is provided with guiding openings 578, alignable with the plug screws 560 on opposite sides of the central screw, for reciprocably and guidingly receiving a pair of guide tubes 580 extending parallel to the central tube 568. The tubes 580 are sealed within the openings 578 as by O-ring grooves in the side walls of the openings and O-rings 582 disposed in such grooves. The outer ends of the tubes are reduced and secured by clamping screws 584 in split clamping apertures in the opposite ends of the tie bar 574. Rotatably extending through each of the tubes 568 and 580 is a screw-operating rod 586 having secured to the inner end thereof, as by a transverse pin 588, a socket wrench 590 adapted to receive the head of the corresponding camming screw 560 on the plug 542. A seal between each rod 586 and its corresponding tube 568 or 580 is provided, as by an O-ring 592 disposed in a circumferential groove within each tube. Each rod 586 constantly is urged inwardly of its corresponding tube 568 or 580 by a coil compression spring 594 interposed between the inner end of the tube and its wrench 590. The inner end of the central plug-carrying tube is provided with an enlarged interiorly-threaded socket adapted to engage with the plug boss. Inward movement of each rod 586 relative to its corresponding tube 568 or 580 is limited by a collar 596 pinned on the outer end of each rod, for bearing engagement against the outer end of the corresponding tube. The outer end of each rod 586 is squared, as at 598, or of another non-circular configuration, for engagement by a turning tool (not shown).

In order to install the plug 542, the latter is positioned so that the wrenches 590 will engage the heads of the camming screws 560, which are unscrewed sufficiently to permit the locking elements 548 to be pushed back fully into their recesses 552, and the tube 568 is rotated by the hand wheel 570 to thread the socket 577 onto the boss 564 of the plug 542, to thus support the plug on the end of the tube while the engagement between the wrenches 590 and the camming screws orients the plug for proper insertion into the fitting opening. As the socket 577 is threaded onto the boss 564, it will be seen that the rods 586 will move outwardly relative to their tubes 568 or 580, but that the springs 594 will maintain the wrenches 590 engaged with the heads of the screws 560. The plug 542 is then held within the bell 566 by the clamping collar 376 while the bell is bolted to the gate valve 56. Thereupon, the gate valve 56 is open, the collar 376 loosened, and the plug 542 moved, by the bar 574, from within the bell 566, through the gate valve 56, and into the access opening in the fitting 544 until the plug flange 504 seats on the gasket 55 on the rim 58 of the opening. As described heretofore with reference to the plug disclosed in FIGURES 21 to 23, the feed nut 362 and yoke 364 may be employed to force the plug 542 to its full extent of insertion into the fitting opening and to retain the plug in such position.

After the plug 542 has been fully inserted, the outer ends of the rods 586 are engaged and turned to screw the camming screws 560 inwardly and thus force the locking elements 548 outwardly into locking engagement with the locking recesses 546 in the fitting 544, and to retain such elements in their locking position. Thereupon, the central plug-carrying tube 568 is rotated by the hand wheel 570 to unscrew the socket 577 from the boss 564 on the plug 542. Whereupon, the tubes 568 and 580, together with their rods 586, are drawn upwardly into the bell 566, by the tie bar 574, and the clamping collar 376 retightened to retain the tubes in this position. Thereafter, the bell 566 and the gate valve 56 are unbolted and removed from the fitting 544 and a cap 538 installed thereon.

In the event that removal of the closure 542 is desired for subsequent line-stopping operations, the cap 538 is removed, and the gate valve 56 and bell 566 are rebolted to the fitting 544. The tubes 568 and 580 are then pushed inwardly until the socket 577 on the central tube 568 engages the boss 564 on the plug 542. Thereupon, the tube 568 is rotated, by the hand wheel 570, to screw the socket 577 onto the boss 564. In this connection, it will be seen that during this operation the rods 586 can move slightly rearwardly to accommodate the necessary relative axial movement between the central rod and its tube 568 occasioned by the abutting engagement between the central screw 560 and the central wrench 590. The rods 586 may then be turned until their wrenches 590 engage with the heads of the screws 560, and then further rotated to unscrew the camming screws 560 and permit line pressure to force the locking elements 548 back into their plug recesses 552 and out of locking engagement with the locking recesses 546 in the fitting 544. Whereupon, the tube 568 may be moved outwardly to withdraw the plug 542 into the bell 566, and the gate valve 56 closed, so that the bell, together with the plug, can be removed for connection of the aforedescribed stopping apparatus to the gate valve. In the event that line pressure is not effective, for any reason, to retract the locking elements 548, it will be seen that withdrawing movement of the plug 542, by the tube 568, will be effective to cam the locking elements back into their corresponding plug recesses 552 because the locking recesses 546 in the fitting 544 are of less than 180° semi-circular configuration.

*The inserted valve and valve-inserting apparatus*

In some situations it may be desirable to install a relatively permanent valve in the line 46 instead of temporarily shutting off flow therethrough by the line-stopping apparatus described above. In such a situation, after the fitting 40 has been installed on the line 46, and the cutting operation performed on the line to remove a section thereof and provide opposed flat line ends 78 and 80 within the fitting, the inserted valve shown in FIGURES 31 to 36 may be installed on the fitting 40 to form a relatively permanent valve for controlling flow through the line.

The inserted valve includes a bonnet 600 having an exterior peripheral portion 602 substantially complementary to and adapted to be inserted in the access opening 48 in the fitting 40. The insertable portion 602 of the bonnet 600 is bevelled on its lower outer edge, as at 604, to facilitate insertion into the fitting opening 48 and provided with locking recesses 606, similar to those 512 on the closure plug 502, i.e., complementary to and for reception of the locking elements 516 on the fitting 40. A seal between the bonnet 600 and the fitting 40 is provided by an O-ring 608 disposed in a peripheral groove in the bonnet for engagement with the side edges 50 of the fitting opening 48. Outwardly of the O-ring 608 the bonnet 600 is provided with a peripheral flange 610 adapted to seat on the gasket 55 on the rim of the fitting opening 48 in the same manner as the closure plug 502 illustrated in FIGURE 21.

Figure 33:
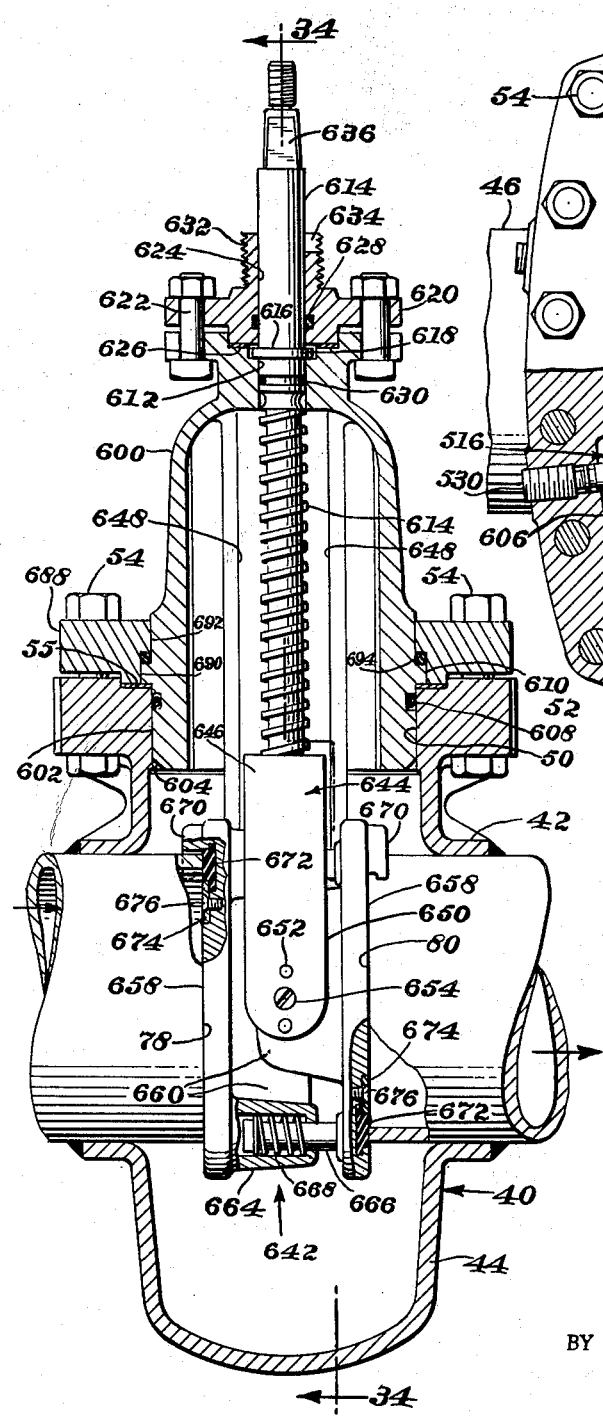
FIGURE 33 is a side elevational view, partly in vertical section, of the apparatus shown in FIG. 31, but illustrating the completion of the operation of inserting a valve in a line. The valve operating hand wheel is omitted.
Figure 35:
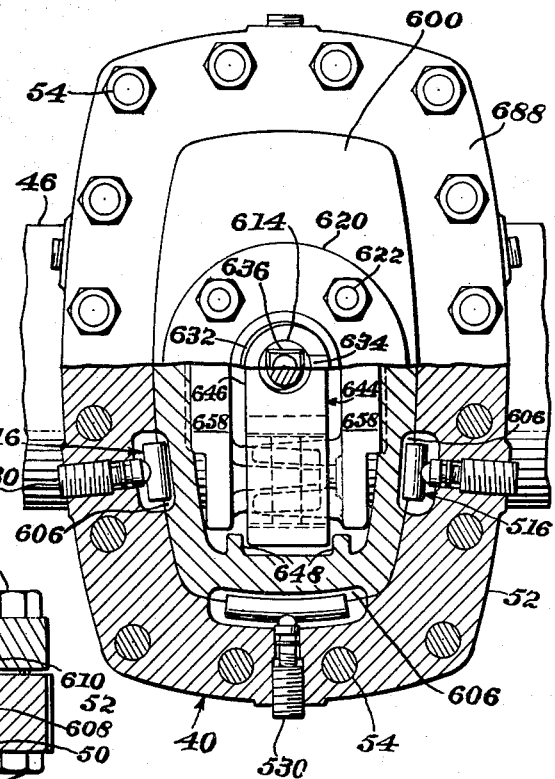
FIGURE 35 is a plan view, partly in horizontal section, taken substantially on the line 35—35 of FIG. 34.

Extending through a central bore 612 in the bonnet 600 is a non-rising valve stem 614 having an integral thrust collar or flange 616 retained between a shoulder 618 formed by a counter-bore in the top of the bonnet, and a flanged cap 620 secured, as by bolts 622, to a corresponding flange on the bonnet and having a central bore 624 through which the stem projects (FIGURE 33). An appropriate gasket 626 is interposed between the cap 620 and the bonnet 600, while the valve stem 614 is sealed to the cap by an O-ring 628 disposed in a circumferential groove in the cap bore 624. Preferably, the valve stem 614 also is sealed to the bonnet bore 612 by an O-ring 630 disposed in a circumferential groove in the stem. The cap 620 is provided with an exteriorly threaded boss 632 surrounding the valve stem 614, and having a notch 634 in its rim, for reasons later explained. The outer end of the valve stem 614 is squared, as at 636, or of other non-circular configuration, for the reception of a valve-operating hand wheel 638 that is secured in place by a nut 640 threaded onto a reduced outer end of the stem.

The inserted valve embodies a valve gate assembly 642 generally similar in construction to the stopper assembly 408 previously described. The valve gate assembly 642 includes a generally U-shaped frame 644 having a central aperture in its base 646 threadedly engaged with the valve stem 614. Two opposite sides of the bonnet 600 are provided with pairs of interior guiding ribs 648 which straddle the arm portions 650 of the frame 644 to restrain the latter against rotation, so that rotation of the valve stem 614 imparts linear movement to the valve gate assembly 642. The guiding ribs 648 project below or forward of the lower edge of the bonnet 600 substantially to the upper side of the line 46, when the bonnet is installed on the fitting 40, in order to permit the valve gate assembly 642 to operatively extend below the lower edge of the bonnet, as shown in FIGURE 34.

The arm portions 650 of the frame 644 are of bifurcated construction, as best shown in FIGURE 34, and secured between the two parts of each of the arm portions, as by dowels 652 and screws 654, is a cam element 656 that is of substantially diamond-shaped configuration in cross section, similar to the cam element 430. Disposed on opposite sides of the frame 644 are two stopper plates 658 having, on their opposed inner sides, sets of overlapping wing members 660 having cam slots 662 within which are received the corresponding cam elements 656. This construction is substantially identical to that of the stopper assembly 408 previously described. Consequently, when relative linear movement between the plates 658 and the frame 644 takes place in directions extending parallel to the valve stem 614, the plates are forced apart or drawn toward each other. Additionally, the valve plates 658, at each of their four corners, are provided with hollow bosses 664, screws 666, and coil compression springs 668 for constantly urging the plates toward each other.

On the outer face of each plate 658, at that edge thereof adjacent the base 646 of the frame 644, are arcuate abutment or stop members 670 in position to engage the sides of the line ends 78 and 80. The outer face of each plate 658 has an annular valve washer insert 672 that is retained in place by a retaining ring 674 secured to the plate by screws 676. The washers 672 are adapted to engage the line ends 78 and 80 to effect a tight seal thereagainst.

In order to install the inserted valve, the stopper-inserting apparatus previously described and illustrated in FIGURES 11 to 14 is used, save that the brackets 400 are removed and the stopper-carrying tube 334, together with its enclosed valve-operating rod 386 and nut 394, are replaced by a valve-carrying and orienting rod 678 rigidly secured to the guide bar 344 and having an enlarged socket 680 at its forward or lower end adapted to receive the projecting end of the valve stem 614, when the hand wheel 638 and nut 640 are removed therefrom. On the rim of the socket 680 is a forwardly projecting lug or key (not shown) adapted to fit into the key notch 634 in the rim of the boss 632 on the valve cap 620 so that the inserted valve will be restrained against rotation and properly oriented for insertion of the bonnet 600 into the fitting 40 opening during the operation of installing the inserted valve. The inserted valve is supported on the end of the rod 678 by a coupling nut 684 engaged with the threads on the boss 632 and also with a circumferential flange 686 on the end of the rod.

After the inserted valve has been connected to the rod 678, as described above, and the bell 326 has been rebolted onto the gate valve 56, the latter is opened and the inserted valve moved from within the bell, through the gate valve, and inserted into the opening in the fitting 40 until the O-ring 608 on the bonnet 600 seals with the edges 50 of the fitting opening and the peripheral flange 610 on the bonnet seats on the gasket 55 on the rim of the fitting opening. Thus, the bonnet 600 and the fitting 40 together define a valve chamber. As previously described, the yoke 364 and feed nut 362 may be employed to force the bonnet 600 to its full extent of insertion into the fitting opening.

After the bonnet 600 has been so inserted, the screws 530 on the fitting 40 are operated to project the locking elements 516 into locking engagement with the locking recesses 606 in the valve bonnet. Thereupon, the screws 340, which secure the rod 678 to the guide bar 344, are removed and the bell 326 unbolted from the gate valve 56, so that the bell, together with all of the parts carried thereby, except the rod 678, can be slid upwardly or rearwardly on the latter. After the bell 326 has been so separated from the upper end of the gate valve 56 to an extent sufficient to provide access to the coupling nut 684, the latter is unscrewed from the boss 632 so that the rod 678 can be removed along with the bell. Alternatively, the bell 326 can be provided with a hand-hole (not shown) having an exteriorly-removable gasketed cover (not shown) to provide access to the coupling nut 684 prior to unbolting the bell from the gate valve 56.

Thereafter, the gate valve 56 is unbolted and removed from the fitting 40 and a retaining ring 688 is placed over the bonnet 600 and bolted to the fitting 40 in place of the gate valve. The retaining ring 688 preferably has a depending flange 690 which closely surrounds the periphery of the flange 610 on the bonnet 600 and seats against the gasket 55 on the rim of the fitting opening. Additionally, the ring 688 preferably has an inwardly extending flange 692 closely surrounding the bonnet 600 in outwardly spaced relation to the bonnet flange 610 to provide an endless chamber within which is disposed an O-ring 694 to provide an additional seal against the entry of dirt or the like into the groove in the periphery of the bonnet containing the O-ring 608. Thereafter the hand wheel 638 and its retaining nut 640 are installed on the valve stem 614.

To close the valve, it will be seen that as the hand wheel 638 is turned in one direction the valve gate assembly 642 will be moved between the line ends 78 and 80 and that when the stop members 670 on the valve plates 658 engage the sides of the line ends the assembly will be expanded into tight sealing engagement oppositely against the two line ends. Rotation of the hand wheel 638 in the opposite direction to open the valve first serves to retract the frame 644 of the gate assembly 642 and to contract the latter by the interaction of the cam elements 656 with the cam slots 662 in the wing members 660 of the valve plates 658 and also by the contractive urging of the springs 668. Continued rotation of the hand wheel 638 in the same direction serves to retract the gate assembly 642 substantially completely within the bonnet 600 and out of the direct path of flow between the line ends 78 and 80 so that substantially unobstructed flow can take place in the line 46.

Figure 36:
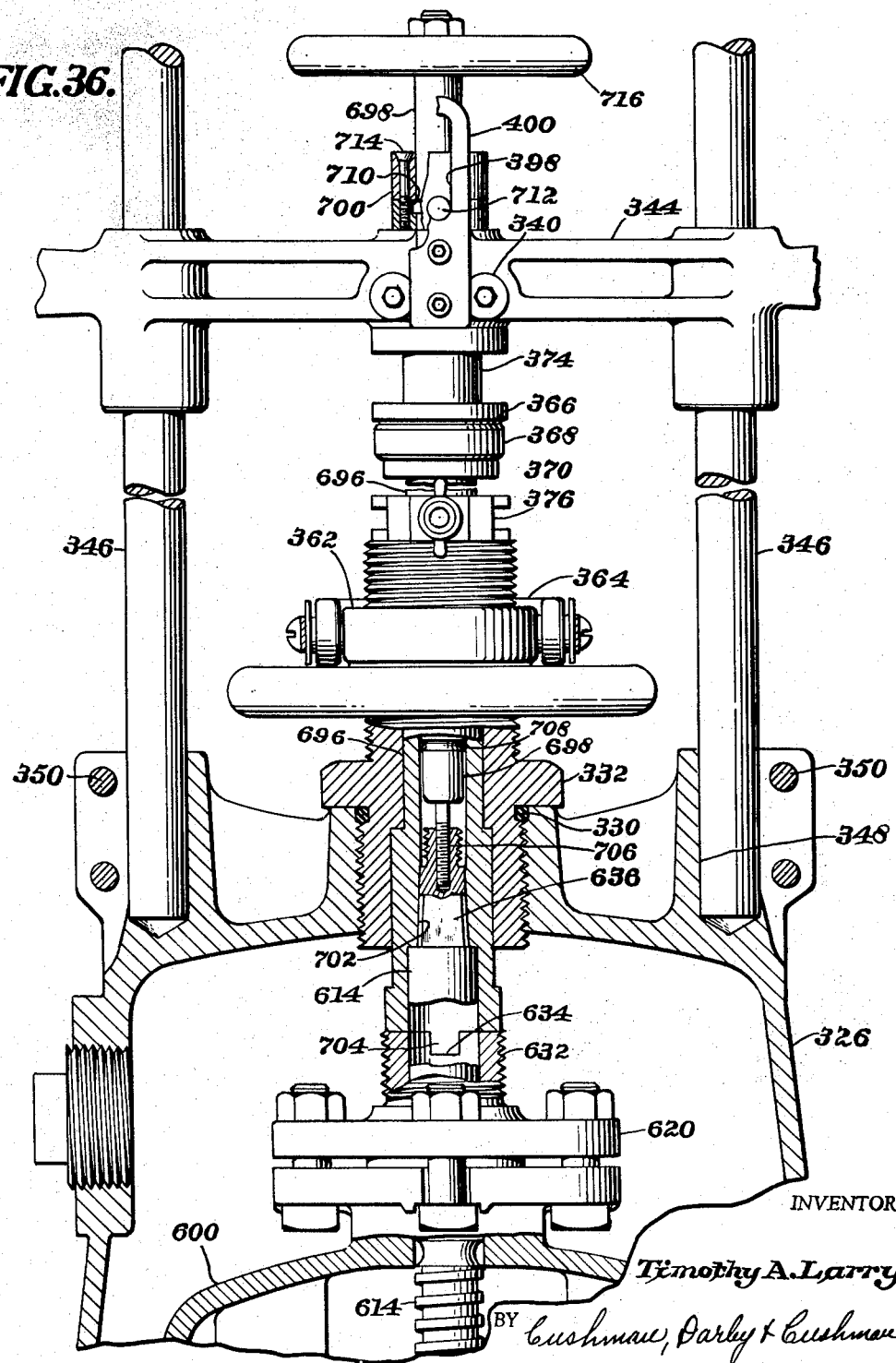
FIGURE 36 is an enlarged fragmentary view, partly in vertical section, corresponding to FIG. 31 but illustrating a modified form of apparatus for installing an inserted valve embodying this invention on a line.

Referring now to FIGURE 36 of the drawings, there is shown a modified type of apparatus for installing an inserted valve embodying this invention. This apparatus is substantially the same as that shown in FIGURES 11 to 14 for inserting the stopper assembly 408 previously described, save that the stopper-carrying tube 334, valve-operating rod 386, and nut 394 are replaced by a valve-orienting tube 696, a valve-carrying rod 698 extending through the tube 696, and a thrust bearing member 700, respectively. The lower or forward end of the tube 696 is interiorly enlarged for reception of the projecting outer end of the valve stem 614 and has an inner portion 702 of an interior configuration complementary to the squared portion 636 of the valve stem so that when the stem portion 634 is received in the tube portion 702, relative rotation is restrained therebetween. The rim of the tube 696 is provided with a forwardly or downwardly extending key or lug 704 for interlocking engagement within the key notch 634 in the rim of the bonnet boss 632 in order to correctly orient the valve bonnet 600 during its insertion into the fitting 40, as previously described. The lower or forward end of the rod 698 is provided with a reduced threaded extension 706 adapted to be screwed into a complementary socket in the end of the valve stem 614. This socket is the only modification which need be made to the inserted valve to enable it to be installed with the modified valve-inserting apparatus. An O-ring 708 disposed in the circumferential groove in the rod 698 provides a seal between the latter and the tube 696. On its projecting outer end the rod 698 is provided with a circumferential thrust flange or collar 710 engaged within a complementary circumferential groove in the thrust-bearing 700 which has lugs 712 extending from its opposite sides for guiding engagement within the slots 398 in the brackets 400. For assembly purposes, the thrust-bearing member 700 may be formed in two parts secured together by screws 714. The extreme outer end of the rod 698 may be provided with a hand wheel 716.

In operation of this modified type of valve-inserting apparatus, the outer end of the valve stem 614 is inserted partially into the enlarged end of the tube 696 until the squared portion 636 of the stem engages within the interiorly squared portion 702 of the tube, and then the bonnet 600 is rotated until the key lug 704 and the notch 634 are in alignment. Whereupon, the valve stem 614 is inserted to its full extent into the enlarged end of the tube 696. The hand wheel 716 is then rotated to screw the rod extension 706 into the end of the valve stem 614, and during this operation the lugs 712 on the thrust-bearing member 700 travel down to the bottom of the slots 398 in the brackets 400, so that the entire inserted valve is firmly attached to the end of the rod 698 and secured against rotation relative to the tube 696.

The bell 326 is then rebolted to the gate valve 56, the latter opened, and the tube 696 pushed forwardly or downwardly by the handles on the guide bar 344 to insert the bonnet 600 into the fitting 40, as previously described. After the bonnet 600 has been locked in position in the fitting 40 by the locking elements 516, the hand wheel 716 is reversely rotated to unscrew the valve-carrying rod 698 from its engagement with the valve stem 614, and in this connection it will be seen that the stem 614 is restrained against rotation by its engagement within the interiorly squared portion 702 of the tube 696. It also will be seen that during this unscrewing operation the slots 398 in the brackets 400 permit the rod 698 to move upwardly or rearwardly for disengagement from the valve stem 614. After such disengagement has been accomplished, the bell 326 can be unbolted from the gate valve 56 and removed therefrom, together with the tube 696 and the rod 698, and the gate valve 56 unbolted and removed from the fitting 40. Thereafter, a retaining ring 688 can be installed in exactly the same manner as heretofore described with reference to FIGURES 33 and 34.

It will be seen that the foregoing principles and apparatus can be applied to the installation of orifice metering valves or equipment in a line, wherein the valve plates 658 would be replaced by plates (not shown) having calibrated orifices therein. Hence, it will be understood that the terminology of the claims is broad enough to encompass such an application.

In many cases it would be advantageous to be able to remove the bonnet, together with the valve stem and valve gate assembly, of a conventional gate valve for replacement or repair purposes without shutting down the line controlled by the valve. Occasionally, a valve stem becomes bent, a disk or plate of a valve gate needs refinishing, etc., but normally the entire line controlled by the valve must be shut off in order to replace or repair the damaged parts. By employing the principles and apparatus of this invention, however, a shut down need not be made.

Thus, for example, the casing of any ordinary gate valve can be constructed with a bonnet-receiving opening and locking elements similar to the opening 48 and elements 516 of the fitting 40 which can be considered to be a valve casing, while the valve bonnet can be constructed to fit within the casing opening and have locking recesses in the manner of the bonnet 600. Obviously, such a construction can be applied to a valve of either the rising or non-rising stem type.

As a further consideration, a conventional gate valve, having a bolted-flange bonnet, can be converted to the repairable without shut down type by providing the casing of the valve with a bolted flange adaptor ring (not shown) having locking elements similar to the elements 516, and replacing the bonnet of the valve with a bonnet (not shown) similar to the bonnet 600 and adapted to cooperate with the ring and the valve inserting and extracting apparatus shown in FIGURES 31 to 36.

It thus will be seen that the objects of this invention have been fully and effectively accomplished. It will be realized, however, that the foregoing specific embodiments have been shown and described only for the purpose of illustrating the principles of this invention and are subject to extensive change without departure from such principles. Therefore, this invention includes all modifications encompassed within the spirit and scope of the following claims.

I claim:

1. The method of connecting a valve into a pipe line while in service, the steps comprising: securing about the line an enclosure having a sealable opening; cutting out a section of the line within the enclosure to provide opposed flat line ends by operations conducted through said openings; and sealingly securing to said enclosure, within and closing said opening, a gate valve bonnet carrying an expansible gate assembly movable linearly between and directly sealable oppositely against said line ends, all without escape of line fluid from said enclosure.

2. A pipe stopper adapted to be inserted between opposed flat ends of a severed pipe line, comprising: a frame; means on said frame attachable to a stopper inserting and operating rod; a pair of stopper plates movably carried by said frame on opposite sides thereof; means defining wedging surfaces on said frame and on said plates effective to force the latter oppositely apart on relative linear movement between said frame and plates in a direction extending longitudinally of the rod; stop means on said plates engageable with one side of the line ends to arrest linear movement of said plates during insertion of the stopper while permitting continuing linear movement of said frame by the stopper-carrying rod in order to effect said relative movement and thereby force said plates oppositely against the line ends, one of said plates having a port therethrough provided with a valve seat at the inner side of said one plate; a valve member movably carried by said one plate for seating and unseating cooperation with said seat; and means on said valve member for connecting the same to a valve-operating rod extending through said stopper-carrying rod.

3. A pipe stopper adapted to be inserted between opposed flat ends of a severed pipe line, comprising: a frame; means on said frame attachable to a stopper inserting and operating rod; a pair of stopper plates movably carried by said frame on opposite sides thereof; means defining wedging surfaces on said frame and on said plates effective to force the latter oppositely apart on relative linear movement between said frame and plates in a direction extending longitudinally of the rod; stop means on said plates engageable with one side of the line ends to arrest linear movement of said plates during insertion of the stopper while permitting continuing linear movement of said frame by the stopper-carrying rod in order to effect said relative movement and thereby force said plates oppositely against the line ends; and shear means carried by at least one of said plates for engagement with at least a portion of the edge of one of the line ends, as said plate is forced thereagainst, in order to cut off any feather or burr on said edge portion resulting from the line severing operation.

4. A pipe stopper adapted to be inserted between opposed flat ends of a severed pipe line, comprising: a generally U-shaped frame; a stopper inserting and operating tube connected to the base portion of said frame; a pair of stopper plates movably carried by the arms of said frame on opposite sides of the latter, at least one of said plates having a port therethrough; means defining wedging surfaces on said arms and on said plates effective to force the latter oppositely apart on relative linear movement between said frame and plates in a direction extending longitudinally of said tube; stop means on the outer faces of said plates engageable with one side of the line ends to limit the extent of insertion therebetween of said plates while permitting continuing inserting movement of said frame by said tube in order to effect said relative movement and force said plates oppositely against the line ends; a valve member movably carried by said one plate on the inner side thereof for seating and unseating cooperation with the inner side of said port; and a valve-operating rod connected to said valve member and extending through said tube.

5. The structure defined in claim 4 including interengaging cam means on the one plate and on the valve member for effecting normal movements of the latter toward and away from the port on reciprocating movements of the valve-operating rod, and means defining a loose connection between said rod and valve member to permit said normal movements and also movement of said valve member with said one plate on movements of the latter toward and away from the other plate.

6. A pipe stopper adapted to be inserted from a pressure chamber into a stopper fitting secured to a pipe line and between opposed flat ends of the line formed by severing the latter within the fitting, the combination comprising: a frame; a stopper inserting and operating rod connected to said frame and adapted to extend to the exterior of said chamber in sealed relation therewith; a pair of stopper plates movably carried by said frame, at least one of said plates having a port therethrough; wedge means carried by said frame and plates and effective to force the latter oppositely apart on relative linear movement between said frame and plates in a direction extending longitudinally of said rod; stop means on said plates engageable with corresponding stop means within the fitting to arrest inserting movement of said plates in advance of inserting movement of said frame to thereby effect said relative movement and force said plates oppositely against said line ends; valve means carried by said one plate for controlling said port; and rod means connected to said valve means for operating the same and adapted to extend to the exterior of the chamber in sealed relation therewith.

7. The structure defined in claim 6 including spring means engaged with the plates for constantly urging them toward each other.

8. An inserting and positioning assembly for an expansible pipe line stopper adapted to be inserted between opposed flat ends of a severed pipe line to seal off at least one of said ends and having a pressure-equalizing port controlled by a valve and adapted to communicate with the one line end, the combination comprising: a stopper-inserting and expanding tube adapted to be nonrotatably connected to the stopper; a rotatable and reciprocable valve-operating rod concentrically enclosed within said tube; a stopper bell having said tube, and enclosed rod, extending in sealed relation and for axial movement therethrough; fixed guide means on said bell; rigid means fixed against rotation to the outer end of said tube and guidingly engaging said guide means for maintaining said tube against rotation; a thread on the outer end of said rod; a nut engaged with said thread; and means fixed on said rigid means and engaged with said nut for restraining rotation of the latter while permitting a limited range of axial movement of said nut relative to said tube.

9. A pipe line stopper assembly comprising: a stopper for insertion into a stopper fitting secured to a pipe line and between opposed flat ends of a severed section of the line, said stopper having a frame, a pair of stopper plates movably carried by said frame, at least one of said plates being adapted to seal off one of said line ends and said one plate having a pressure-equalizing port therethrough, wedge means for forcing said plates oppositely apart and against the line ends on relative linear movement between said frame and said plates, stop means on said plates for engagement with corresponding stop means in the fitting to arrest inserting movement of said plates in advance of inserting movement of said frame in order to effect said relative movement, a valve member carried by said one plate for controlling said port, and inter-engageable cam means on said one plate and valve member for moving the latter normally toward and away from the inner side of said port on movement of said valve member in directions extending parallel to the direction of inserting movement of said stopper; a stopper bell adapted to be connected fluid-tight to the stopper fitting; a stopper-inserting tube secured to said frame and extending in sealed relation and for axial movement through said bell; a valve-operating rod connected to said valve member against axial movement relative thereto, said rod extending in sealed relation through said tube; fixed guide means on said bell; rigid means fixedly secured to the outer end of said tube and guidingly engaging said guide means for maintaining said stopper against rotation; means threadedly engaged with the outer end of said rod for effecting axial movement of the latter on relative rotation therebetween; and means fixed relative to the outer end of said tube and engageable with said threaded means for permitting a limited range of axial movement thereof relative to said tube.

10. The structure defined in claim 9 wherein the stop means on the plates are disposed on the outer sides thereof for engagement with stops constituted by the sides of the line ends.

11. The structure defined in claim 9 including a connection between the rod and valve member for permitting relative movement therebetween in directions extending normal to the axis of said rod.

12. An inserting valve assembly comprising: a fitting member adapted to be secured on a pipe line to define an enclosure thereabout provided with an access opening; means on said member for detachably connecting thereto a pressure chamber in communication with said opening; a valve bonnet member insertable at least partially into said opening to define, with said fitting member, a valve housing; sealing means carried by one of said members for effecting a seal therebetween when said bonnet member is inserted; locking means carried by said fitting member in sealed relation therewith, operable from the exterior thereof, and engageable with the insertable portion of said bonnet member for securing the latter to said fitting member; an expansible valve assembly carried by said bonnet member for insertion into, and withdrawal from, a cut-out portion of the line within said fitting member to control flow through the line; a threaded rotatable valve stem connected to said assembly and extending through said bonnet for effecting said insertion and withdrawal; and interfitting guide means on said bonnet and said assembly for preventing rotation of the latter on rotation of said stem.

13. The structure defined in claim 12 in which the cut-out portion defines opposed flat line ends and the valve assembly comprises a pair of valve plates adapted to be inserted between and forced oppositely apart against opposed flat ends of the line defined by the cut-out portion.

14. The structure defined in claim 12 including a peripheral flange on the bonnet engageable with the rim of the access opening to limit the extent of insertion of said bonnet into said opening.

15. The structure defined in claim 12 in which the cut-out portion defines opposed flat line ends and the valve assembly comprises a frame carried by the stem, a pair of valve plates movably carried by said frame, wedge means defining engageable wedging surfaces on said frame and plates for forcing the latter oppositely apart and into sealing engagement against the line ends on relative linear movement between said frame and plates, and stop means on said plates engageable with corresponding stop means within the fitting member to arrest inserting movement of said plates in advance of inserting movement of said frame and thereby effect said relative movement.

16. The structure defined in claim 15 in which the plate stop means are on the outer sides thereof in position to engage against the sides of the line ends.

17. The structure defined in claim 15 including spring means engaged with the plates for constantly urging them toward each other.

18. An assembly for installing a closure plug in a line stopper fitting having an access opening provided with locking recesses in the edges thereof for reception of locking elements projectable from the periphery of the plug by rotatable means on the top of the plug, and wherein the top of the plug is provided with a threaded boss concentric with the rotatable means, the combination comprising: a plug bell; a plug-inserting tube extending in sealed relation and for axial and rotary movement through said bell, said tube having a threaded socket on the inner end thereof for detachable engagement with the plug boss; a rod extending in sealed relation and for axial and rotary movement through said tube for operating the rotatable means; means on the inner end of said rod for detachable interfitting engagement with the rotatable means to rotate the latter by rotation of said rod; and resilient means engaged with said tube and rod for urging the latter inwardly relative to the former.

19. The structure defined in claim 18 including stop means on the rod engageable with the tube for limiting the extent of inward movement of said rod.

20. An assembly for installing a non-circular closure plug in a line stopper fitting having a non-circular access opening provided with locking recesses in the edges thereof for reception of locking elements projectable from the periphery of the plug by a plurality of rotatable means on the top of the plug, and wherein the top of the plug is provided with a threaded boss concentric with one of the rotatable means, the combination comprising: a plug bell; a plug-inserting tube extending in sealed relation and for axial and rotary movement through said bell, said tube having a threaded socket on the inner end thereof for detachable engagement with the boss; a plurality of parallel plug-guiding tubes, one for each of the other rotatable means, extending parallel to said plug-inserting tube in sealed relation and for axial movement through said bell; a rod extending in sealed relation and for axial and rotary movement through each of said tubes; means on the inner end of each of said rods for interfitting engagement with the corresponding rotatable means to rotate the latter by rotation of said rod; resilient means engaged with each of said tubes and its corresponding rod for urging the latter inwardly relative to the former; rigid means secured to the outer ends of all of said tubes against movement longitudinally of the latter, said plug-inserting tube being rotatably secured to said rigid means; and stop means on each of said rods engageable with the corresponding tube for limiting the extent of inward movement of the former.

21. An assembly for closing the access opening in a line stopper fitting wherein the fitting is provided with locking recesses in the edges of the opening, the combination comprising: a closure plug for the access opening; locking elements carried by said plug and projectable from the periphery thereof into the recesses; a plurality of rotatable means on the top of the plug for projecting said elements; a threaded boss concentric with one of said rotatable means; a plug bell; a plug-inserting tube extending in sealed relation and for axial and rotary movement through said bell, said tube having a threaded socket at its inner end for detachable engagement with said boss; a plurality of parallel plug-guiding tubes, one for each of the other rotatable means, extending parallel to said plug-inserting tube in sealed relation and for axial and rotary movement through said bell; a rod extending in sealed relation and for axial and rotary movement through each of said tubes; detachable interfitting means on each of said rotatable means and the inner end of the corresponding rod for rotating the former by the latter; resilient means engaged with each of said tubes and its corresponding rod for urging the latter inwardly of the former; rigid means secured to the outer ends of all of said tubes against movement longitudinally of the latter, said plug-inserting tube being rotatably secured to said rigid means; and stop means on each of said rods engageable with the corresponding tube to limit the extent of inward movement of the former.

22. A valve comprising: a casing member; a valve element movable within said casing member to open and close the valve, said casing having an access opening through which said element is removable; means on said casing about said opening for detachably connecting a pressure chamber to said casing in communication with said opening; a bonnet member insertable at least partially into said access opening to close the latter and to cooperate with said casing member to define a valve chamber, said bonnet member and valve element being removable with each other into the pressure chamber when the latter is connected to said casing; sealing means carried by one of said members for effecting a seal therebetween when said bonnet member is inserted; and locking means carried by said casing member, operable from the exterior thereof and of the pressure chamber when the latter is connected to said casing member, and engageable with the insertable portion of said bonnet member for securing the latter to said casing member.

23. The structure defined in claim 22 including means on the bonnet member detachably engageable by tool means within the pressure chamber for removing said bonnet member and valve element into the pressure chamber.

24. The structure defined in claim 22 in which the locking means includes locking elements disposed in recesses in the edges of the casing member opening and movable inwardly into corresponding recesses in the insertable portion, and stem means on said locking elements extending in sealed relation through the wall of the casing member about said opening.

References Cited in the file of this patent

UNITED STATES PATENTS

| | | |
|---|---|---|
| 291,697 | Cutting | Jan. 8, 1884 |
| 434,796 | Leslie | Aug. 19, 1890 |
| 587,092 | French | July 27, 1897 |
| 983,960 | Watson | Feb. 14, 1911 |
| 1,174,342 | O'Brien | Mar. 7, 1916 |
| 1,216,284 | Cash | Feb. 20, 1917 |
| 1,560,489 | Yager | Nov. 30, 1925 |
| 1,850,040 | Turner | Mar. 15, 1932 |
| 2,115,992 | Koppl | May 3, 1938 |
| 2,171,937 | Larry | Sept. 5, 1939 |
| 2,237,476 | Cline | Apr. 8, 1941 |
| 2,550,984 | Ferguson | May 1, 1951 |
| 2,566,019 | Dempsey | Aug. 28, 1951 |
| 2,676,780 | Wheatley | Apr. 27, 1954 |
| 2,771,096 | Ver Nooy | Nov. 20, 1956 |
| 2,797,948 | Tangard | July 2, 1957 |
| 2,812,778 | Ver Nooy | Nov. 12, 1957 |
| 2,895,353 | Webber | July 21, 1959 |
| 2,906,491 | Young | Sept. 29, 1959 |
| 2,937,782 | Heimberger | May 24, 1960 |

FOREIGN PATENTS

| | | |
|---|---|---|
| 78,925 | Denmark | Feb. 28, 1955 |